US005751089A

United States Patent [19]
Stridsberg

[11] Patent Number: 5,751,089
[45] Date of Patent: May 12, 1998

[54] BRUSHLESS DC MOTORS/GENERATORS

[75] Inventor: Lennart Stridsberg, Enskede, Sweden

[73] Assignee: Stridsberg Innovation AB, Enskede, Sweden

[21] Appl. No.: 256,984

[22] PCT Filed: Jan. 29, 1993

[86] PCT No.: PCT/SE93/00070

§ 371 Date: Sep. 28, 1994

§ 102(e) Date: Sep. 28, 1994

[87] PCT Pub. No.: WO93/15547

PCT Pub. Date: Aug. 5, 1993

[30] Foreign Application Priority Data

Jan. 29, 1992 [SE] Sweden ................ 9200241
Sep. 11, 1992 [SE] Sweden ................ 9202622
Dec. 30, 1992 [SE] Sweden ................ 9203937

[51] Int. Cl.$^6$ ................................ H02K 1/22
[52] U.S. Cl. ................................ 310/266
[58] Field of Search ............ 310/12, 156, 266, 310/268

[56] References Cited

U.S. PATENT DOCUMENTS

| | | | |
|---|---|---|---|
| 3,230,405 | 1/1966 | Sorensen | 310/94 |
| 4,623,808 | 11/1986 | Beale et al. | 310/12 |
| 4,859,974 | 8/1989 | Kliman et al. | 310/12 |
| 4,870,306 | 9/1989 | Petersen | 310/12 |
| 4,900,965 | 2/1990 | Fisher | 310/12 |
| 4,945,268 | 7/1990 | Nihei et al. | 310/12 |
| 5,081,388 | 1/1992 | Chen | 310/266 |
| 5,168,187 | 12/1992 | Baer et al. | 310/268 |
| 5,212,419 | 5/1993 | Fisher et al. | 310/266 |
| 5,345,133 | 9/1994 | Satake | 310/266 |

FOREIGN PATENT DOCUMENTS

| | | | |
|---|---|---|---|
| 971680 | 3/1959 | Germany | 310/266 |
| 1438536 | 1/1969 | Germany | 310/266 |

Primary Examiner—Clayton E. LaBalle
Attorney, Agent, or Firm—Limbach & Limbach LLP

[57] ABSTRACT

In a rotational/linear brushless DC motor/generator the rotor/slide has many equally spaced permanent magnet poles of alternating polarity and it has no or few magnetically permeable iron parts. These magnets cover typically slightly more than half the pole pitch in trapezoidal embodiments. The stator consists of one or several pairs of two stator parts facing each other. Each stator part has a plurality of poles with the same pitch as the rotor/slide poles. The stator parts in a pair are arranged on each side of the rotor/slide and are displaced 180 electrical degrees from each other. Each one of the two stator parts in a pair has windings for one phase in order to polarize the poles in the stator part in alternating polarity. The gaps between the stator poles facing the rotor/slide in the same stator part are small compared to the pole pitch. In this way high torque/force DC motors/generators with low weight and high efficiency are provided.

16 Claims, 12 Drawing Sheets

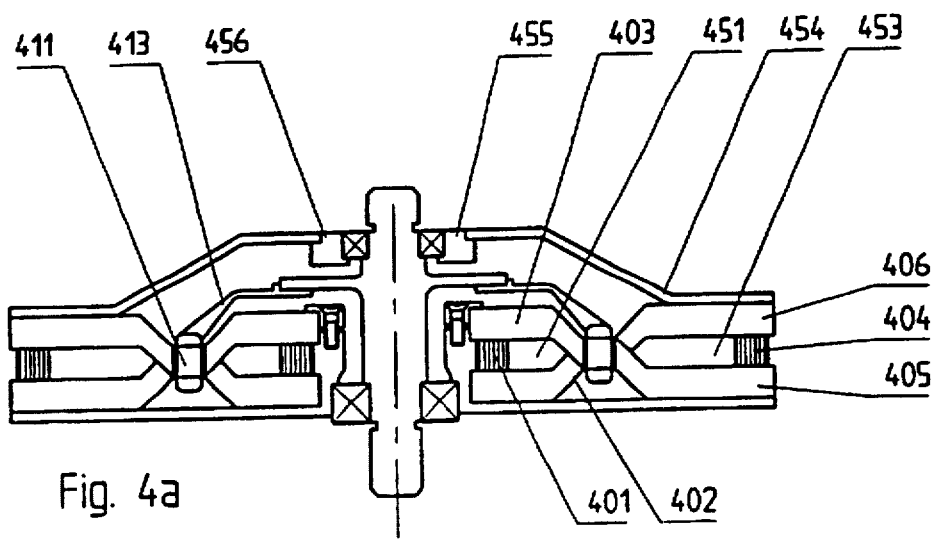
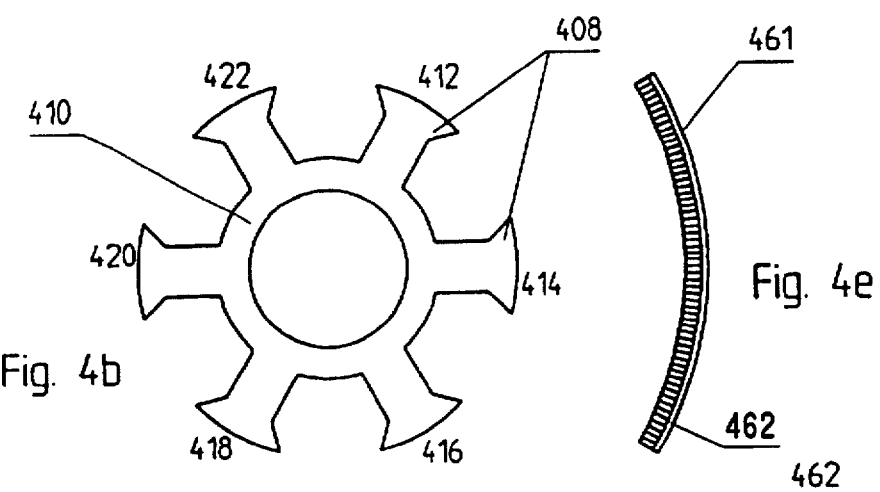
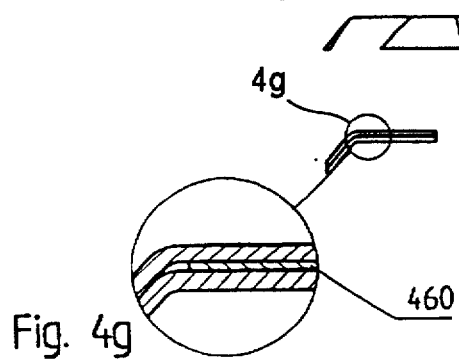

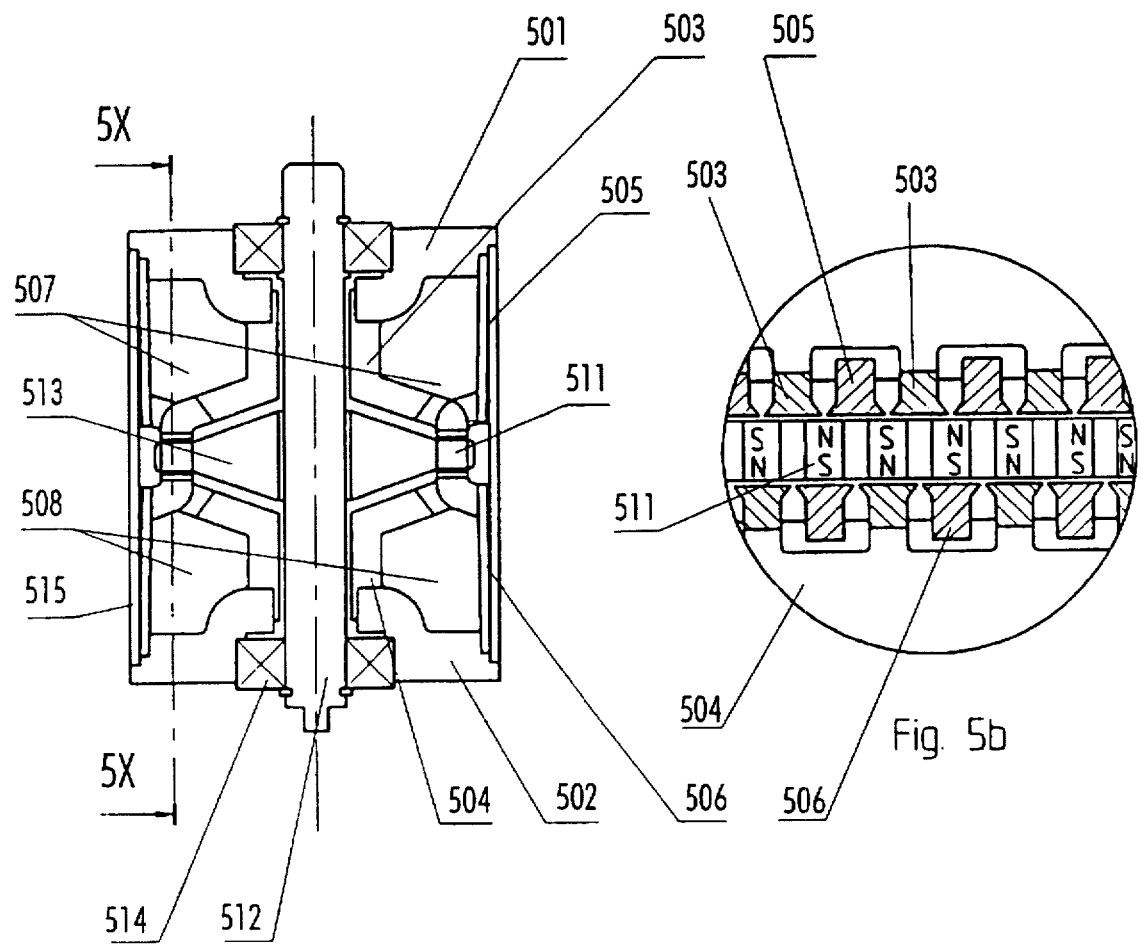
Fig. 5a
Fig. 5b
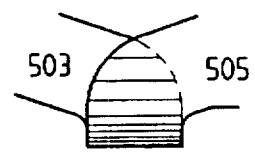
Fig. 5c

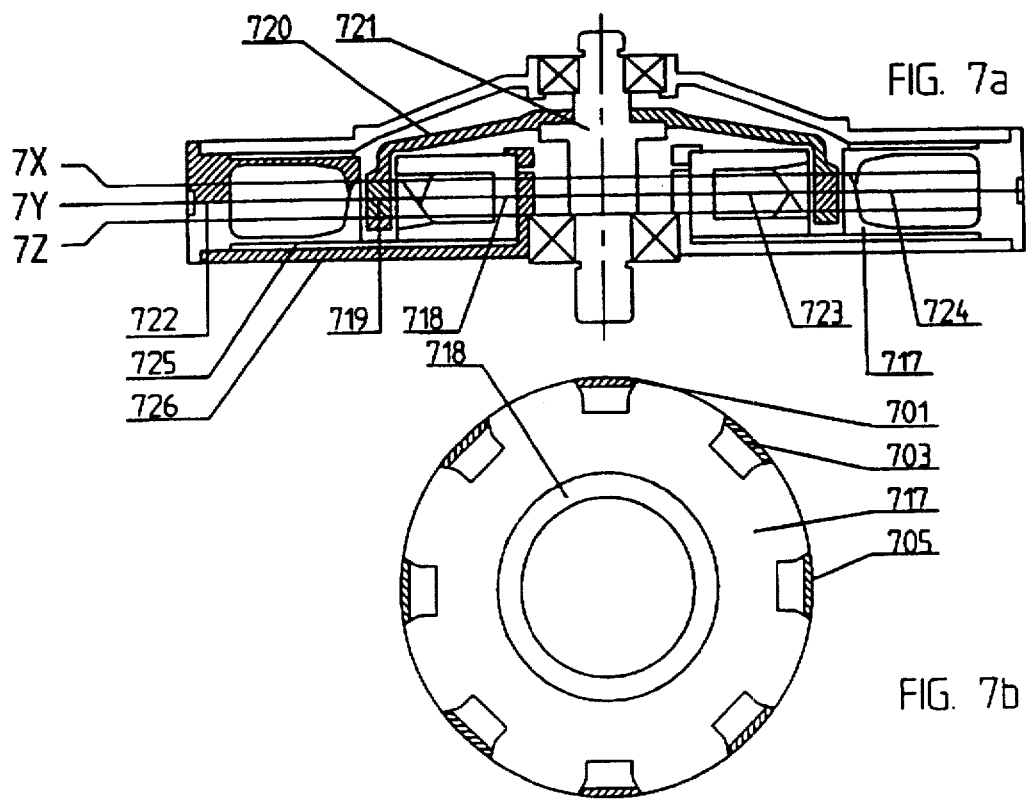
FIG. 7a
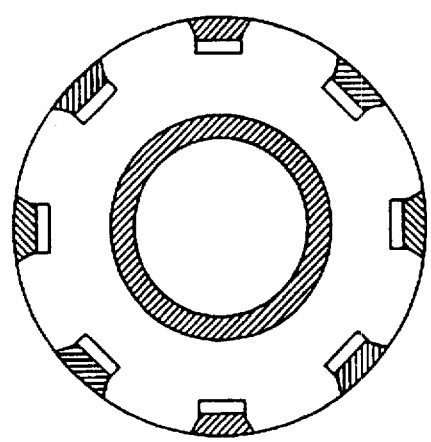
FIG. 7b
FIG. 7c
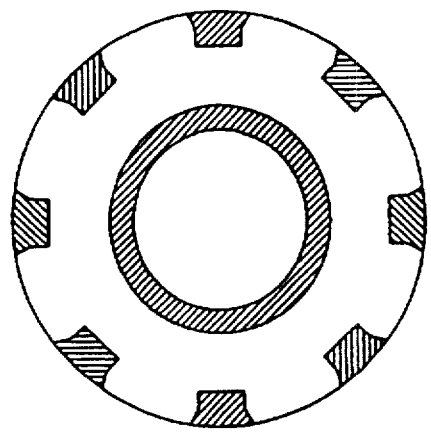
FIG. 7d

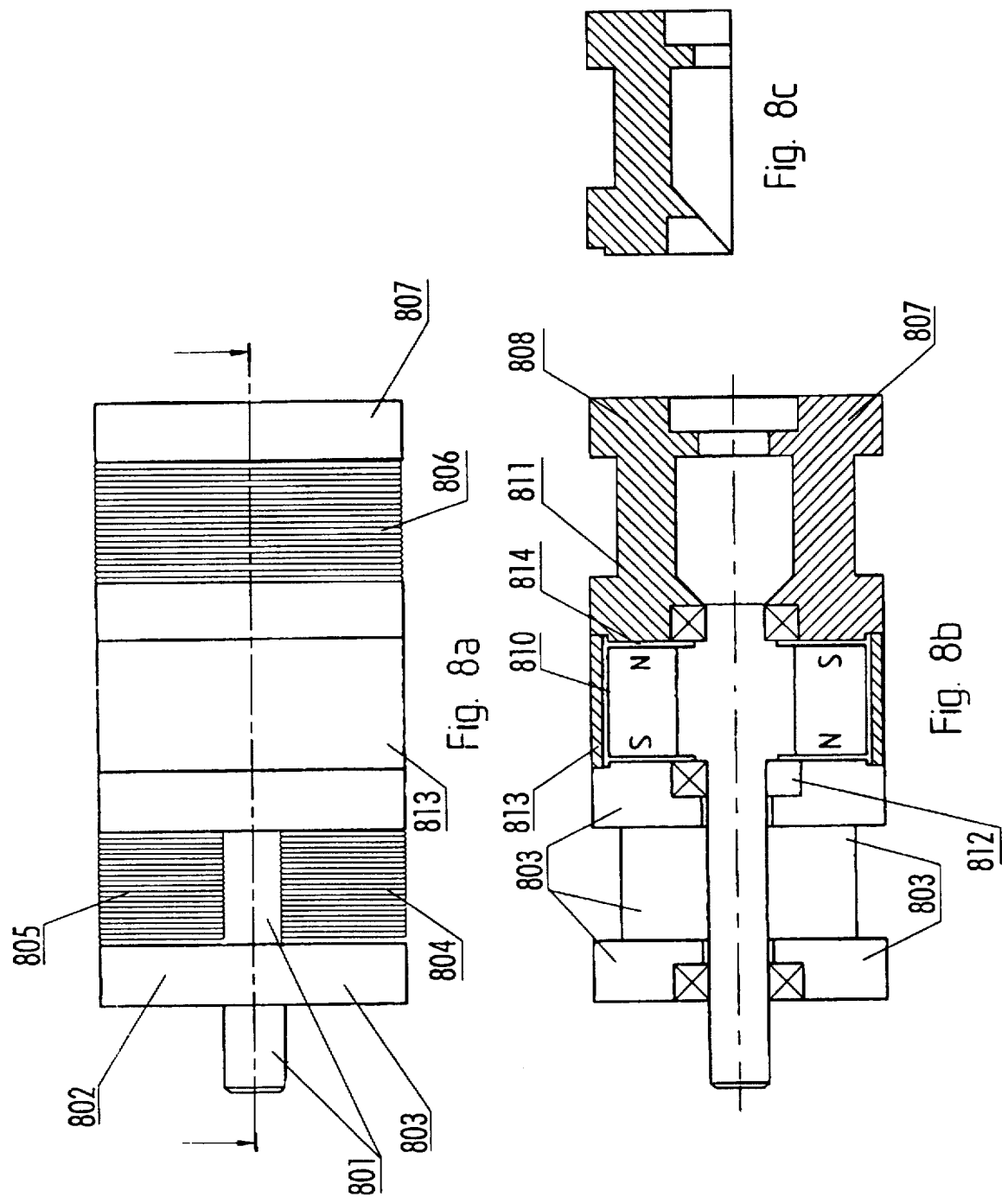

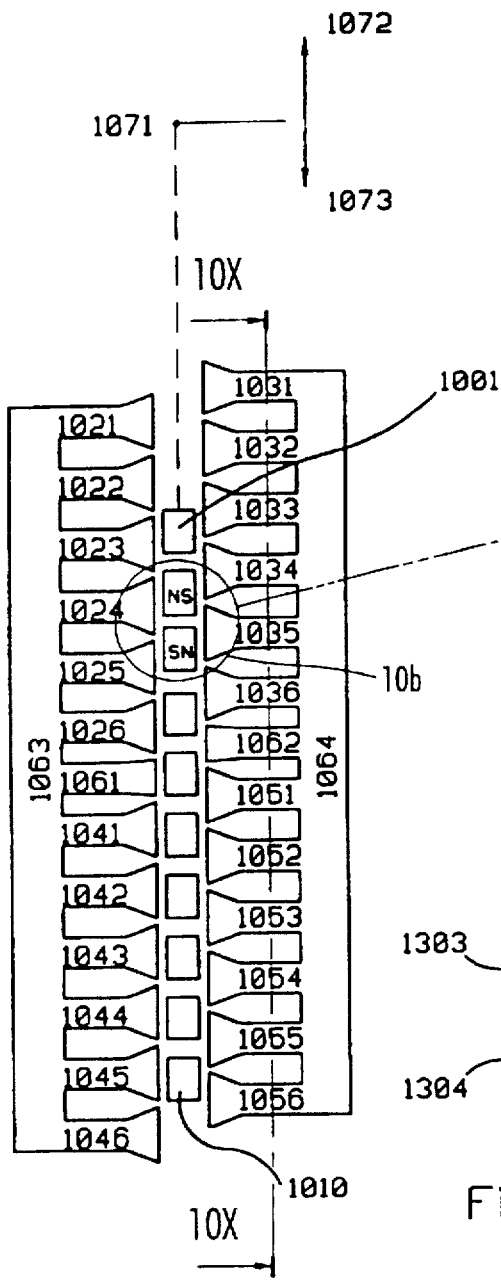
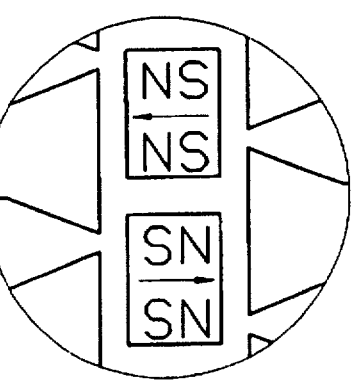
Fig. 10b
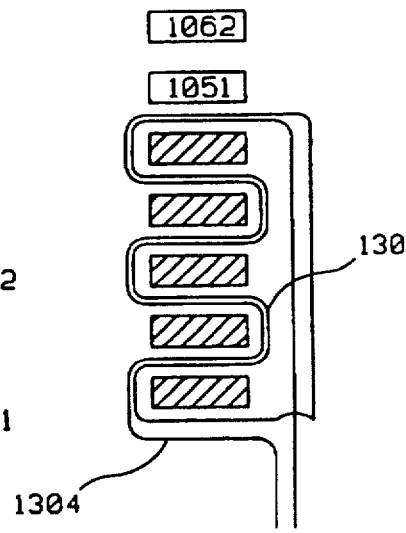
Fig. 10a
Fig. 10
Fig. 11

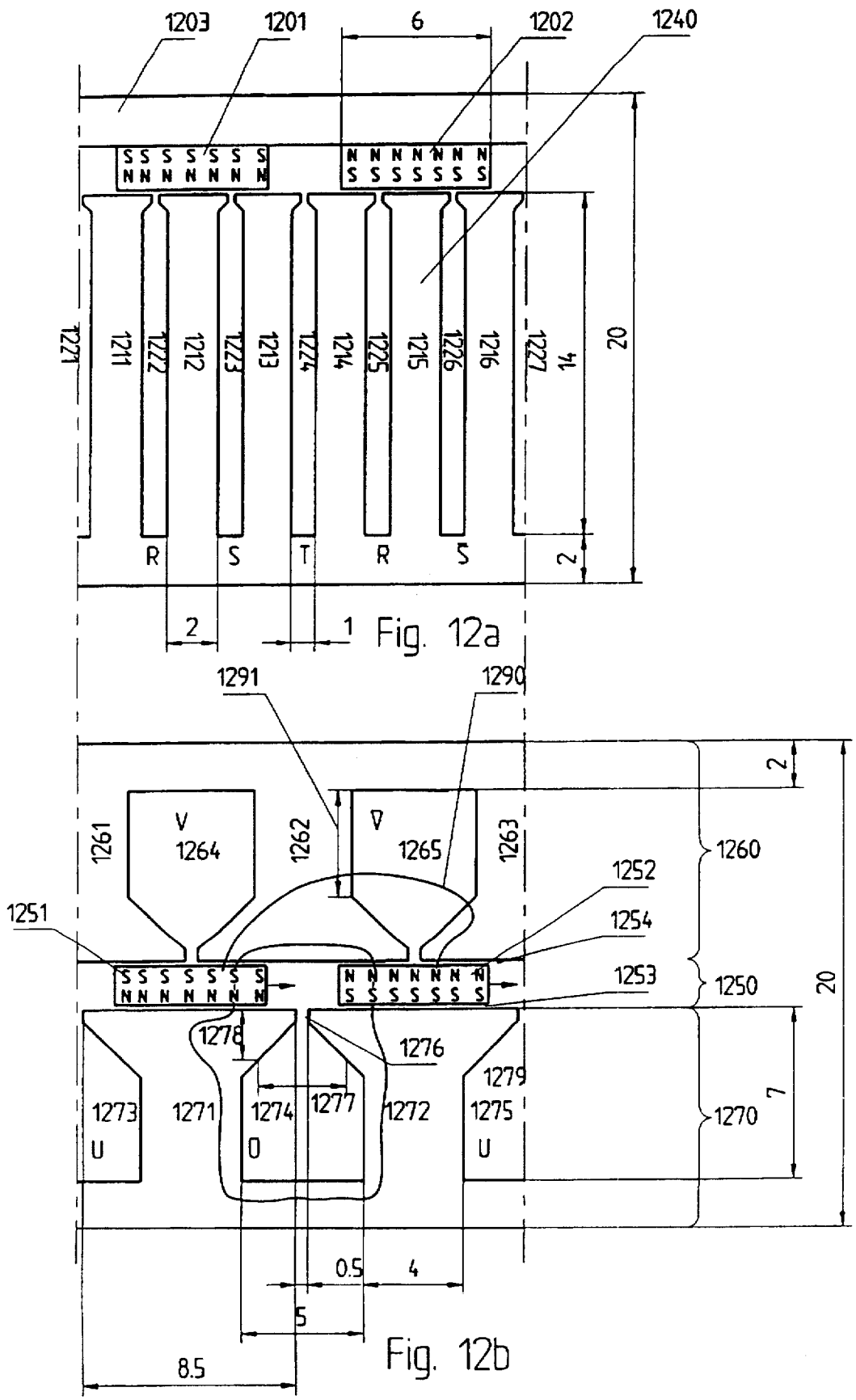

BRUSHLESS DC MOTORS/GENERATORS

FIELD OF THE INVENTION

The invention is concerned with two-phase or section wise twophase permanent magnetized, brushless DC motors and generators, rotating or linear.

BACKGROUND OF THE INVENTION

Most electric motors can equally well be used as a motor or as a generator. In the following the word motor is generally used even if all described embodiments equally well can be used as generators.

Many electric motors or generators can be built either as rotating or linear machines with little changes. In the following it should be understood that even if some embodiments are described only for rotational or linear machines, the same principles can be applied for the other kind of electric machine. Thus for instance the words "slide" or "slider" and "rotor" may signify basically the same part.

The market for brushless DC motors in the range of several Watts and higher is totally dominated by designs having stators where the windings of three phases are overlapping. This means that the area circumvented by a coil belonging to one phase do not only contain a flux carrying iron pole; it will also circumvent slots containing windings belonging to other phases. This gives a not very efficient use of pole iron mass and/or requires long copper windings.

The market for brushless DC motors in the range of several Watts and higher is also totally dominated by designs having rotors where the permanent magnets are assembled on a magnetic flux permeable support structure (normally made of iron) that closes the flux path. This structure gives a high inertia or mass of the rotor.

A typical prior art motor is disclosed in the international application PCT/DE86/00437. This motor has two stator parts and both stator parts carry windings of more than one phase. This means that the area circumvented by a coil belonging to one phase do not only contain a flux carrying iron pole; it will also circumvent slots containing windings belonging to other phases. This gives an inefficient use of the pole iron mass and requires long copper windings, that is this prior motor is heavy and has high copper losses. Furthermore, to use the multi-phase windings efficiently, the magnets must cover a large part of the circumference, thus giving rotors with a high moment of inertia.

Motors where each stator is divided into two parts offer increased possibilities for simplified windings and thus for low cost motors. There are several prior art designs using a single coil winding concentric with the motor axis for each pase. However, they have severe limitations when used for highly efficient low inertia motors.

One such prior art motor is disclosed in U.S. Pat. No. 4,714,853. Here an annular permanent magnet rotor, which has a basically cylindrical shape, is inserted between two stator parts, each carrying one phase. Each stator is made of two mating, cuplike pole pieces of a single steel plate defining an annular closed space where the windings are located. The pole pieces have a plurality of salient poles facing the rotor. The radial thickness of the teeth is constant, and there is a considerable gap between the salient poles from each pole piece. If used with small motors using weak magnets (the preferred embodiment in FIG. 2 of U.S. Pat. No. 4,714,853 evidently uses ferrite magnets), the total flux generated will easily pass through a steel sheet of acceptable thickness. If run with low speeds, the flux change frequency will be low, thus giving acceptable eddy current losses in the pole pieces. The eddy currents will however increase rapidly for larger motors and higher energy permanent magnet material. Both of these cases will require an increased pole piece thickness, which will rapidly increase the eddy currents at a given speed. Higher speeds will also increase the eddy currents due to higher flux change rates. If the tangential gap between the salient poles is kept small, the self-inductance of the phase winding and the portion of the rotor flux lost due to stray flux between the salient teeth will be considerable and will increase rapidly with increasing radial thickness of the teeth (i.e. due to thicker sheet material in the pole piece), increased stator height and increased number of teeth. If the tangential gap is large compared to the pole pitch, the residual torque will be high. The design will also carry stray fields outside the motor in some positions of the rotor due to the same effect as will be described below for FIG. 4. The effect is however probably small due to the limited flux which can be carried in the single sheet tooth.

The U.S. Pat. No. 4,922,145 and the Japanese patent publication 62-95958 are both concerned with two-phase motors having permanent disc-shaped rotors having magnets covering the total circumference. Both designs have two stators, each one built from two parts and having a single phase coil winding in each stator. If attempted for high performance motors, both designs would face the same problems as indicated above for U.S. Pat. No. 4,714,853. Both motors have a constant axial thickness of major part of the salient poles, this giving the same problems as discussed above for the constant radial thickness of the cylinder stator of U.S. Pat. No. 4,714,853.

Both designs will cause stray fields outside the motor in some positions of the rotor due to the same effect as will be described below for FIG. 5.

Prior art high performance motors using two stator parts, each one carrying a single-phase winding, avoid the problems discussed above by the use of different mechanical arrangements of the flux carrying stator parts which face the permanent magnet rotor. An embodiment of such a motor is disclosed in EP 0 319 632 A1. In this disc rotor motor, the two stators work on different segments of the disc rotor. This reduces the problems of stray flux losses between the salient poles, as the rotor facing stator poles of phase 1 are grouped together in one group and all rotor facing poles of phase 2 are far away. This arrangement will however only engage about 40% of the disc rotor magnet poles. In the active area of one stator part, only every second disc rotor pole will be engaged. There are also parts of the rotor which do not engage any stator pole at all, as the stator windings occupy some of the space that should contain stator pole pieces. This will require the use of a high grade permanent magnet material which can maintain its magnetic strength even in an open magnetic circuit at high temperatures.

OBJECTS OF THE INVENTION

It is a primary object of the present invention to obtain electric motors with a high torque/force to weight ratio and high efficiency having a reasonably low cogging torque/force.

It is another object of the invention to permit a highly efficient use of low cost grades of high energy magnets.

DESCRIPTION OF THE INVENTION

The motor or generator according to the invention solves or at least significantly reduces the problems mentioned above encountered in prior art motors. Also many of the drawbacks mentioned are eliminated in the motors or generators according to the invention as defined in the accompanying claims.

The permanent magnet rotor/slide has many equally spaced poles of alternating polarity having no or little magnetically permeable iron parts. The permanent magnet rotor/slide magnets cover typically slightly more than half the pole pitch.

The stator consists of one or several pairs of two stator parts facing each other. Each stator part has a plurality of poles with the same pitch as the rotor/slide poles. The stator parts in a pair are arranged on each side of the rotor/slide, and are displaced 90 electrical degrees from each other. Each one of the two stator parts in a pair has windings for one phase in order to polarize the poles in the stator part in alternating polarity. In some embodiments, several pairs of stators parts act on different part of the same rotor/slide.

The gaps between the stator poles facing the rotor/slide in the same stator part are small compared to the pole pitch. The flux conducting parts of the stator are in some embodiments made of plastic moulded parts formed of iron powder bound together by a thermoplastic material which covers the particles and which serves to insulate the particles from each other.

In most permanent magnet synchronous motors, the permanent magnets cover the whole circumference of the rotor. The motors according to the present invention can be designed to correspond to either trapezoidal or sinusoidal motors. In trapezoidal rotary motors according to the present invention, the permanent magnets may in most cases cover only about 55 to 70% of the circumferential length of the rotor. In the case of a trapezoidal linear motor this corresponds to about 55–70% of the active length of the slide or moving part. This reduces the inertia of the rotor or mass of a linear motor slide, and will also reduce the total flux from the rotor. This will give lower fluxes in the stator. This permits either a lower flux density in the stator soft iron part, giving lower iron losses, or thinner soft iron parts, thus giving more space for windings and lower copper losses. For sinusoidally magnetized motors according to the present invention the rotors and slides must have permanent magnet material along almost the total circumference or length. In some embodiments, for example in small motors, it may be cost advantageous to make for example a rotor of a homogenous disc even for trapezoidal motors, as this reduces the assembly cost. Such discs will then be given poles by selective magnetization of parts of the disc.

Thus in one aspect of the invention a brushless, electric motor or generator is provided, comprising an annular rotor having the shape of a relatively thin ring, such as a cylinder or a flat ring. The rotor is arranged to rotate around a rotation axis and is provided with permanent magnet poles, which are alternatingly polarized around the rotor. The motor also comprises an inner stator and an outer stator comprising a permeable base ring provided with permeable salient poles, these poles having coils wound thereabout. The coils belonging to all of the poles of one stator are connected to form one electrical phase and the coils belonging to all of the poles of the other stator are connected to form another electrical phase.

The stator poles may have a width perpendicular to the direction of movement of the rotor, which is approximately uniform over the length of the poles, at least in the regions adjacent to the rotor.

The stator poles may comprise a first portion located at said base ring. This first portion of each pole may then have sides, which are located substantially perpendicular to the direction of movement of the rotor and also to the surface of the rotor adjacent to the pole. The stator poles may comprise lateral protrusions at their ends facing the rotor, the protrusions being connected to the first portion and extending substantially in a direction in parallel and antiparallel with the direction of movement of the rotor, in such a way that only a small gap in the movement direction of the rotor is left between adjacent poles of the inner stator and also of the outer stator compared to the extension of the poles at their sides facing the rotor and in the movement direction of the rotor.

The length of the each one of the lateral protrusions of a pole in the direction in parallel and antiparallel with the movement direction of the rotor may then be of the same order of magnitude as the length of the first portion of the pole in the same direction, for instance about half of the first portion length.

Only a part of the rotor circumference may be provided with permanent magnet poles. Thus a substantial part of the rotor circumference will be uncovered with magnet poles, in such a way that the permanent magnet poles for instance only cover somewhat more than the half, as 55–70% of the circumference of the rotor.

In another aspect of the invention a motor a generator is provided having an annular rotor arranged to rotate about a rotor axis and having the shape of a thin cylinder and provided with permanent magnet poles, which are alternatingly polarized around the rotor. The motor or generator also has an annular inner stator and an annular outer stator, each one comprising a pair of pole pieces. Each one of the pole pieces is also annular and the pole pieces of each pair are located in opposed relationship with each other. Each pole piece comprises on the periphery thereof which faces the rotor circumferentially spaced salient stator poles in such a way that the poles of one pole piece of a pair is interleaved with the poles of the other pole piece of the same pair. Each one of the stators carries an annular coil concentric with the rotation axis, where the coil of the inner stator is connected to form one electrical phase and the coil of the outer stator is connected to form another electrical phase. The pole pieces of each pair form an annular groove, which for the inner stator is open to the rotation axis and for the outer stator is open in the opposite radial direction. Each one of said grooves carries one of said annular coils and a permeable ring is located on the open top of each one of said grooves.

The permeable ring may comprise a large number of metal sheet elements having their sides radially aligned and secured to an inner and outer retaining ring for the inner and outer stator, respectively.

In another aspect of the invention a motor or generator is provided, comprising an annular rotor arranged to rotate about a motor axis and having the shape of a thin cylinder and provided with permanent magnet poles, which are alternatingly polarized around the rotor. The motor or generator also comprises an annular inner stator and an annular outer stator, each one comprising a pair of pole pieces. Each one of the pole pieces is also annular and the pole pieces of each pair is located in opposed relationship with each other. Each pole piece comprises on the periphery thereof which faces the rotor circumferentially spaced salient stator poles, the poles of one pole piece of a pair being interleaved with the poles of the other pole piece of the same pair. Each one of the stators carries an annular coil concentric with the rotation axis, the coil of the inner stator being connected to form one electrical phase and the coil of the outer stator being connected to form another electrical phase. The salient poles of the pole pieces extend generally radially and the salient poles are provided with lateral protrusions at their ends facing the rotor in such a way that only a small gap is left in the circumferential direction between said protrusions of adjacent poles of the inner stator and also of the outer stator.

The ring part of each pole piece may be substantially flat and located in a radial plane. The inner portions of the salient poles may extend generally in parallel with the ring part and the outer portions of the salient poles facing the rotor may extend at an oblique angle in relation to plane of the inner portions and the substantially flat ring part, this angle preferably comprising about 45°, e.g. being in the range 15°–75°.

The pole pieces are preferably made of laminated iron, comprising sheet elements having a configuration including a flat ring part and obliquely bent, salient parts. Also sheet elements having a shape only corresponding to said ring part may be included. These latter elements are then interposed between the first mentioned elements.

In another aspect of the invention a motor or generator is provided, comprising a moveable thin part having a constant width and provided with permanent magnet poles, which are located on the opposite large surfaces of the moveable part and are alternatingly polarized. The motor or generator also comprises a first stator part and a second stator part, each one comprising a pair of pole pieces. The pole pieces of each pair are located in opposed relationship with each other and each pole piece comprises on the surface thereof, which faces the large surfaces of the moveable part, spaced salient stator poles, in such a way that the poles of one pole piece of a pair is interleaved with the poles of the other pole piece of the same pair. Each one of the stator parts carries a coil having a large portion of its wound parts located substantially in parallel with the large surfaces of the thin moveable part, the coil of the first stator being connected to form one electrical phase and the coil of the second stator being connected to form another electrical phase. Only a part of the large surfaces of the moveable part is provided with permanent magnet poles in such a way the permanent magnet poles preferably only cover 55–70% of the circumference of the rotor.

The salient poles of the pole pieces may extend generally in planes perpendicular to the large surfaces of the moveable part. The salient poles may be provided with lateral protrusions at their ends facing the moveable part, the protrusions being directed in the generally longitudinal direction of the moveable part in such a way that only a small gap is left in the longitudinal direction of the moveable part between said protrusion of adjacent poles of the first stator and also of the second stator.

The outer portions of the salient poles facing the moveable part may extend at an oblique angle in relation to the large surfaces of the moveable part, this angle preferably comprising about 45° or being in the range of 15°–75°.

A base part of each pole piece which is located opposite to the moveable part may be located generally perpendicularly to the large surfaces of the moveable part. The inner portions of the salient poles may then extend generally in parallel with the base part and the outer portions of the salient poles facing the moveable part may extend at an oblique angle in relation to plane of the inner portions and the substantially flat base part, this angle preferably comprising about 45° or being in the range of 15°–75°.

The first stator and/or the second stator may comprise two substantially equal stator segments, each stator segment in turn comprising the two pole pieces. These stator segments for each stator may then be located in parallel with each other and carry winding portions belonging to the same coil, these winding portions being generally in parallel with the longitudinal direction of the moveable part.

In another aspect of the invention a part of an electrical machine, typically a rotor or a slide, is provided, comprising permanent magnets attached to a base, said part being movable in relation to another part of the electrical machine, typically the stator. Said magnets are magnetized in a direction substantially perpendicular to the direction of movement and they may, as is conventional, be distributed substantially uniformly over at least a part of the base. The area of the cross sections of a permanent magnet perpendicularly to the direction of movement varies in said movement direction in such a way that said area is significantly larger in a cross section located centrally in said permanent magnet than in cross sections located more close to an edge of said magnet.

Said area of cross sections may then decrease monotonically, at least over a significant distance, in the direction from the centre of said magnet to each one of its edges.

The variation of said area of cross sections may advantageously be substantially sinusoidal.

A permanent magnet may, as is conventional, then normally have a constant width as measured perpendicularly to said movement direction.

A permanent magnet may also have a substantially flat base surface, where it is supported by said base.

A permanent magnet may then be homogenously magnetized or preferably fully magnetized.

BRIEF DESCRIPTION OF THE DRAWINGS

FIG. 4a shows an embodiment of a motor according to the invention having a bellshaped rotor and a single coil winding common to all poles in a phase. The embodiment can suitably be made by the use of stacked iron sheet.

FIGS. 4b and 4c show in plan and elevational views respectively a punched and bent electrical steel plate part used in the inner stator of the motor as shown in FIG. 4a.

FIG. 4d shows two punched and bent electrical steel plate parts similar to that shown in FIGS. 4b–4c having a spacer washer between the parts.

FIGS. 4e and 4f show an alternative flux bridge arrangement comprising an annular ring of electrical steel strips to be used in the stators of a motor similar to that shown in FIG. 4a.

FIG. 4g is a magnified view of the section indicated in FIG. 4d.

FIG. 5a shows an embodiment of a motor according to the invention which has a disc-shaped rotor and a single coil winding common to all poles in a phase. The embodiment can suitably be manufactured by the use of metal powder technology.

FIG. 5b shows in a large scale the position of the poles and permanent magnets of the motor as shown in FIG. 5a.

FIG. 5c shows an enlarged view of the pole pieces illustrated in FIG. 5a indicating the main flux leakage region.

FIG. 6b shows a partial longitudinal section of the linear motor of FIG. 6a.

FIG. 7a shows an embodiment of a motor according to the invention which has a bellshaped rotor and a single coil winding common to all poles in a phase. This embodiment is suitably manufactured by the use of metal powder technology.

FIGS. 7b-7d show sections of a moulded part constituting one fourth of the magnetically permeable parts of the stator system of the motor as shown in FIG. 7a along the lines B—B, C—C and D—D respectively.

FIGS. 8a-8c show an embodiment of a motor according to invention which has a discshaped rotor and stator parts built of totally four identical moulded iron powder parts Principally the same motor can be built using stacks of flat electric steel parts of two to three differently punched shapes.

FIG. 10 shows a four phase linear motor according to the invention having individually wound poles and two pairs of stator parts.

FIG. 11 shows a winding arrangement for a motor similar to that shown in FIG. 10 but intended for motors having far more poles in each group.

FIGS. 12a and 12b show a principal flux pattern in respectively a conventional brushless DC motor and the motors according to the invention.

DETAILED DESCRIPTION OF PREFERRED EMBODIMENTS

Hereinafter the word "rotor" is used to indicate the conventionally moving part of an electric rotational motor and the word "stator" for the conventionally stationary part. However, in some applications, the part named "rotor" may be the stationary part and the part "stator" the moveable part. It should be understood that these words are only used for the ease of describing the invention and that the invention could be used equally well for motors having a stationary "rotor" and a rotating "stator".

In the same way, the words "slide" or "slider" and "stator" are used in the way conventional for linear electric motors. It should thus also be understood that these words are only used for the ease of describing the invention and that the invention could be used equally well for motors having a stationary "slide" or "slider" and a moving "stator".

Also, many of the embodiments described only for rotational electric motors can easily be adapted for use as linear motors and vice versa. Thus the invention must be considered to apply to all electric motors. Also, linear motors can have a curved shape of the path of the moveable part.

Figure 1A:
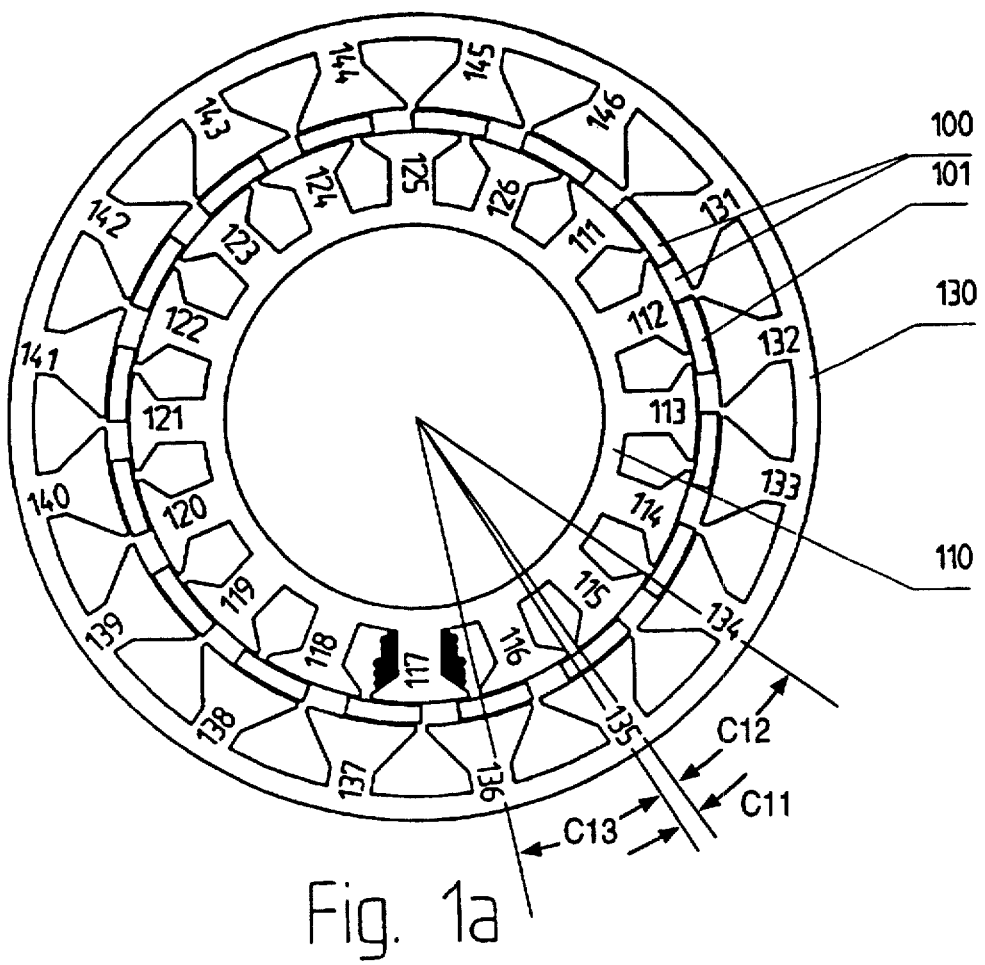
FIG. 1a shows a sectional view of an embodiment of a motor according to the invention that has a bellshaped rotor and individually wound poles. The embodiment is suitable for manufacture by stacked iron sheet technology.
Figure 1B:
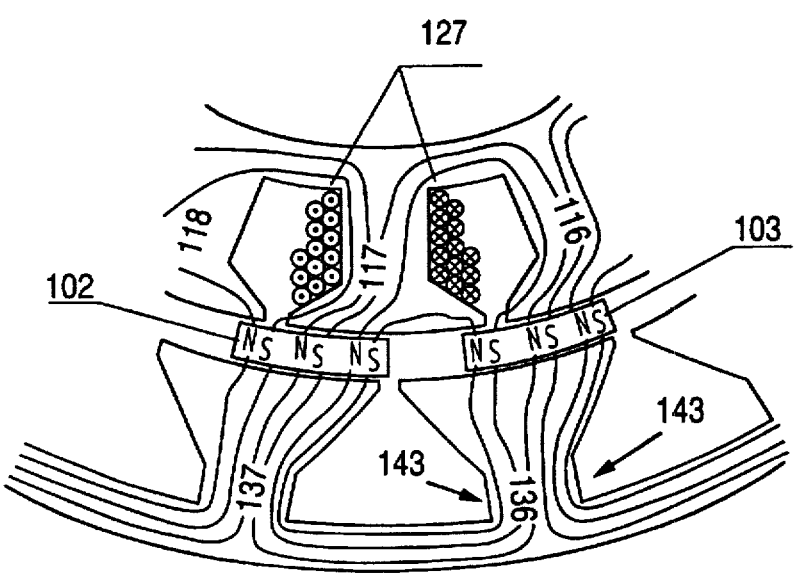
FIG. 1b shows in a larger scale a segment of the airgaps and windings of the embodiment of the motor as shown in FIG. 1a, where the principal magnetic field in the motor segment is illustrated.

FIGS. 1a-1b show a first embodiment of a rotary motor according to the invention. FIG. 1a is a sectional view of the motor as seen in a direction perpendicular to its axis of rotation and FIG. 1b shows an enlarged portion of the same view.

The motor comprises an annular rotor 100, which is inserted in a cylindrical slot between two stators, an inner stator and an outer stator. The active parts of the rotor preferably comprise separate magnets 101, in the case shown 16 magnets; the rotor could however instead comprise a partly magnetized annular ring. The separate magnets are bound to each other or supported by a support element by a magnetically inactive material which is not relevant for the invention and they will thus form a bellshaped rotor. The magnet poles may preferably be made of permanent magnet material like NdFeB or NdPrFeB or SnCo. The permanent magnet poles are oriented so that all even numbered poles have the same polarity and all odd numbered poles have the opposite polarity. The magnets cover somewhat more than ½ of the air gap circumference, for instance about 55–70%.

The inner stator comprises a base ring 110 and 16 pole teeth 111–126 extending radially from the motor axis and made of for example laminated iron like in most conventional electric motors. In the enlarged view in FIG. 1b, the pole tooth 117 is completely visible.

All stator poles (like 111–126) of the inner stator have windings. Only the winding 127 around pole 117 is shown in FIGS. 1a and 1b. The embodiment as shown in FIGS. 1a and 1b is a 16 pole motor (i.e. the rotor has 16 poles) with two electric phases, each having or belonging to one pole group; the 16 poles 111–126 on the inner stator form one group and the 16 poles 131–146 on the outer stator form another group.

All stator poles in one group have the same angular pitch (in the case of the embodiment of FIGS. 1a and 1b 360/16=22.5 degrees), which is the same as the pitch of the permanent magnet poles on the rotor. The gaps between the portions of the stator poles immediately facing the rotor in the same stator part are small compared to the pole pitch, for instance about ⅒–1/20 of the pole pitch. Therefore the poles have circumferentially protruding parts, that is parts which extend along and opposite the path of the moving part, these protruding parts having the largest extension in the region immediately adjacent to the surface of the stator and facing the path of the moveable part.

The wound poles have a coil wound around each single pole. The sections through the 13 wire turns constituting the winding 123 around the pole 117, as seen in FIG. 1b, are marked with dots on the left side and crosses on the right side of the pole. The coils around the even numbered poles 112, 114, 116, 118, 120, etc. are wound in the same direction while the coils around the odd numbered poles 111, 113, 115, 117, 119, etc. are wound on connected in the other, opposite direction. When the coils are energized by current from the associated power electronics, this current will in the inner stator magnetize the odd numbered poles 111–125 in one direction and the even numbered poles 112–126 in the other or opposite direction.

The outer stator has a similar configuration as the inner stator with a base ring 130 and 16 radially salient poles 131–146 with laterally extending portions. The winding pattern is the same; all odd numbered poles are wound or connected to give each pole a polarity opposite to that of the two adjacent poles. The two stators are secured concentrically to each other and 90 electrical degrees (in the case shown 11.25 mechanical degrees) apart.

FIG. 1b also illustrates the magnetic field or the flux flow in the rotor and the two stators. In order to facilitate the understanding of the Figure, each permanent magnet 101 is assumed to be able to drive a magnetic flux corresponding to six flux lines in FIG. 1b. As is shown in the Figure, the flux density can be kept fairly balanced both over the surface of the permanent magnets, in the poles and in the base rings 100 and 120. This permits a thin stator with a uniform and well utilized flux conducting material. This will thus allow light motors generating high mechanical torques.

The relatively constant flux density for all permanent magnets will keep the lowest flux density of the permanent magnets high. This will, with present magnet technology, permit the use of cheaper magnet materials (like NdFeB instead of SmCo) or grades with higher energy density (like using NdFeB materials with BH products of about 260–335 kJ/m3 instead of materials with about 210–265 kJ/m3).

As is easily understood from FIG. 1b, a clockwise movement of the rotor permanent magnets will, during the first almost 10 mechanical or geometrical degrees, hardly change the magnetic flux through the section of the pole 136, which is indicated at 143—143 in FIG. 1b. Therefore almost no emf (electromotive force) is induced in the coil wound around the pole 136 (and because of the symmetry, neither in any other coil wound around the outer stator poles 131–142). On the contrary, there will be a large change in the flux through the coil 123 wound around the pole 117 (and because of the symmetry, also in the coils wound around all inner stator poles 111–122).

If the clockwise movement discussed above should continue approximately 9 mechanical degrees, almost all magnetic flux from the magnet 103 will have left the pole 116 and been transferred to the pole 117. In this new position some of its magnetic flux will start to pass by the pole 137. During the first 9 degrees of the rotor movement, practically the whole flux from the pole 103 was directed through the pole 136. Therefore, when the flux change through the poles 111–122 has almost ended, the hereto almost static magnetic flux through the poles 131–142 will start to change. In this way, in any position of the rotor, current through either the inner or the outer stator will be able to create a torque on the rotor. The other stator may act as a passive flux path and the current through its windings should preferably be zero. (In some positions, i.e. if the rotor in FIG. 1b were to be moved 1 degree counterclockwise, both stators could have one half of the normal current.)

The embodiment shown thus can always use the full strength of all the permanent magnets. (The maximum short term torque is limited by the ability of the permanent magnets to force a magnetic flux through the winding in spite of the winding current.) The motors according to the invention thus do not waste expensive permanent magnets by having parts of them partially utilized or completely unutilized.

Figure 2:
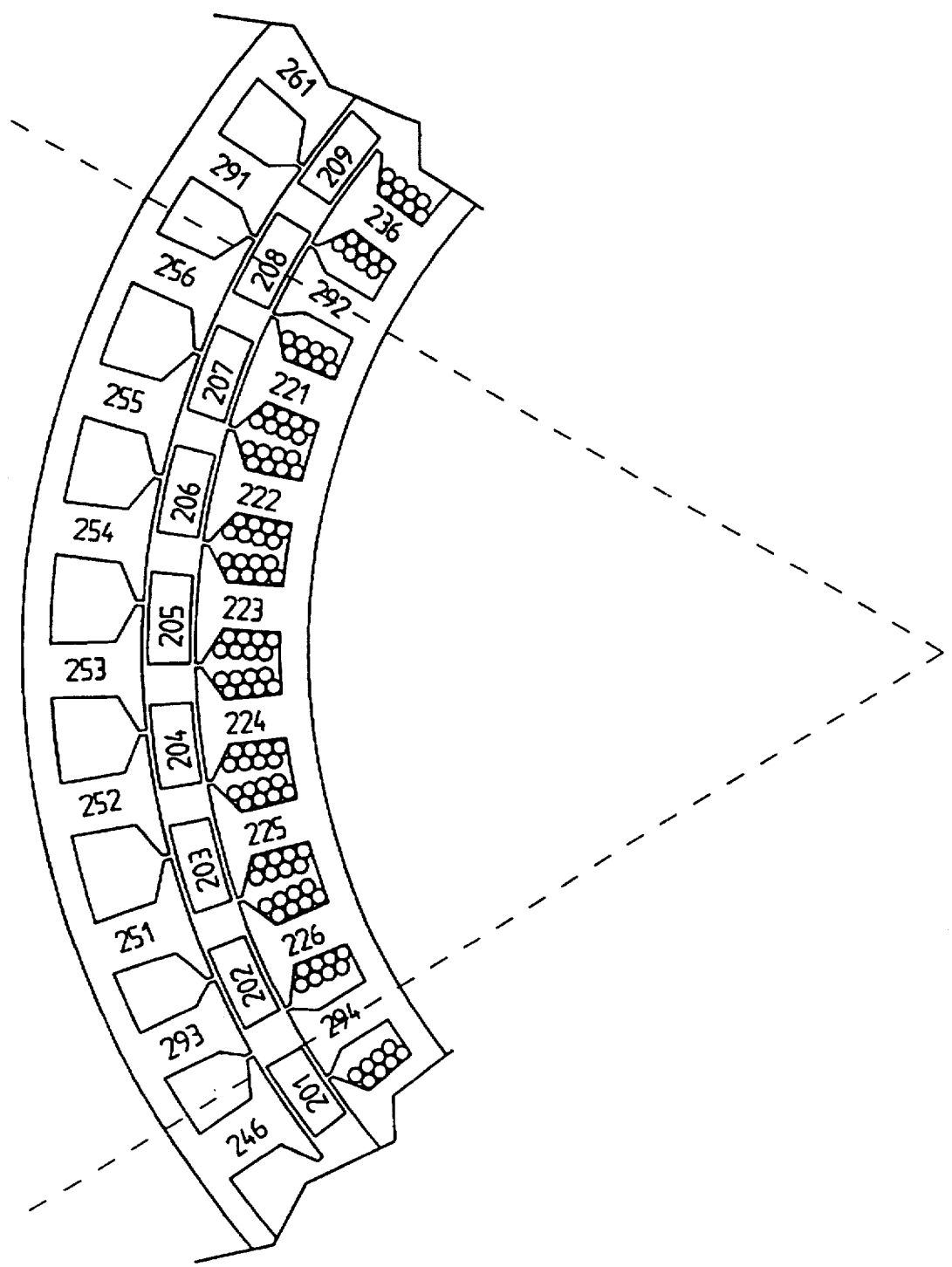
FIG. 2 shows a sixth of a six phase motor according to the invention that has a bellshaped rotor, individually wound poles and six pairs of stator parts.

FIG. 2 shows a sixth of a six phase rotation motor according to the invention having individually wound poles.

The rotor has 40 poles, of which nine 201–209 are shown.

There are twelve stator parts, two for each phase. The inner stator has six pole groups, of which only one is completely shown in the Figure and is located between the dotted radial lines. The group has six poles 221–226. The pole pitch for the six poles in any pole group is identical to or very close to the pitch of the rotor magnets. Adjacent pole groups are separated by unwound flux balancing poles 292 and 294.

The outer stator has six pole groups, of which only one is completely shown in the Figure. The group has six poles 251–256. The pole pitch for the six poles in any pole group is identical to or very close to the pitch of the rotor magnets. Adjacent pole groups are separated by preferably unwound extra, flux balancing poles 291 and 293. The windings on the outer stator are not shown.

Each inner stator group is connected to the same phase as the opposite, diametrically located inner stator group, thus giving three phases on the inner stator.

Each outer stator group are in phase with the diametrically opposite outer stator group, thus giving three phases on the outer stator. The total assembly gives six phases. If the motor magnets and windings are to be fully utilized, these can be driven individually, for example by using one H-bridge for each phase. To optimally utilize the magnets, the two stator pole groups shown in the Figure could be connected to the two phases of a two-phase system (as they face the two sides of the same permanent magnets). The three two phase systems will then be 30 electrical degrees apart or offset. The arrangement gives a mechanical torque having a smaller torque ripple than in the simple motor as shown in FIGS. 1a and 1b. Also the cogging torque will be lower, as for every 30 electrical degrees some rotor magnets will face the center of two of the twelve pole groups.

Figure 3A:
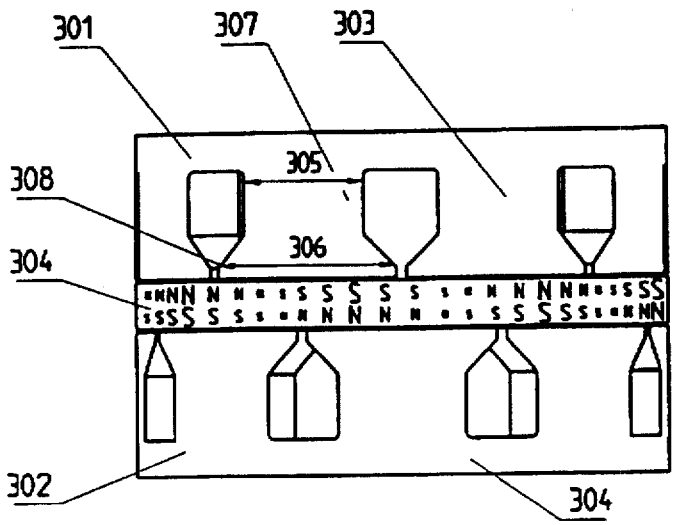
FIGS. 3a and 3b show a the stator and unwound rotor of a motor according to the invention that has a bellshaped rotor and individually wound poles.
Figure 3B:
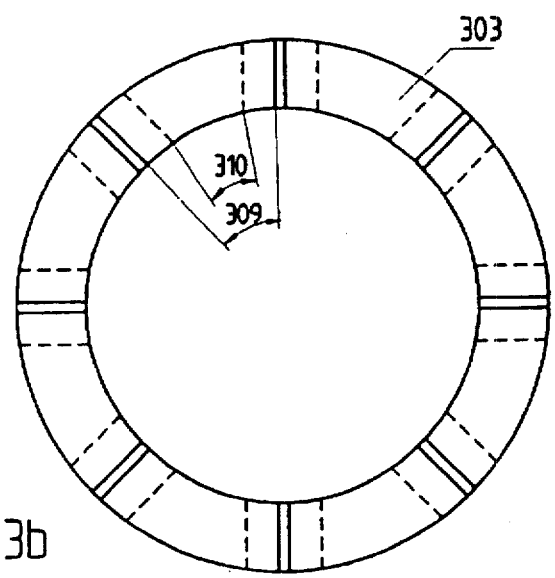

FIGS. 3a and 3b show an axial motor according to the invention. The stator is preferably made of rolled electrical steel. Equipment for producing stator laminations by coiling endless electrical strip iron and stamping the winding slots with gradually increasing slot-to-slot distance to compensate for the successively increased diameter are commercially available.

FIGS. 3a and 3b show the unwound stator and rotor. There are two stator parts 301 and 302, each having 8 poles like 303 kept together by a base ring 304. Each pole has a winding (not shown), and all windings on the same stator part are connected to the same phase.

The rotor 304 has the form of a continuous ring with sinusoidal magnetization and 8 poles. The inner and outer radii of the ring are constant, but the intensity of the magnetization is different on different parts on the ring. This is illustrated by different sizes of the N and S symbols on the ring in FIG. 3a.

FIG. 3b shows the unwound stator part 301 as seen from the rotor. In FIG. 3a the width relation between the length 305 of the first pole part close to the base ring 301 and the added length 306 of the pole pieces 308 protruding from this basic pole width 305 is much less than 2, which is a typical relation as seen in the other figures like FIG. 1, 2 and 10. This is a consequence of the stator shape. As can be seen in FIG. 3b, the same relation in the inner side of the stator, i.e. the relation between the pole width 309 facing the rotor and the pole width 310 of the pole from the base ring is approximatively 2 to 1 as in the other Figures.

The sinusoidal magnetization of the rotor does not require any change from the pole width facing the rotor and the pole width close to the stator base ring. The total flux from a sinusoidally magnetized pole of width 1, length 1 and peak flux density of 1.1 T is the same as for a magnet with width 0.6366, length 1 and flux density of 1.1 T. As the permanent magnet poles for trapeziodally, magnetized motors according to the invention normally is assumed to cover some 55–70% of the rotor surface, the total flux generated by such rotors is close to that of a ideal sinusoidal rotor that covers the whole rotor surface, and would be identical if the trapeziodally magnetized motor had an ideal magnet covering 63.66% of the surface. The relation 2 to 1 between the pole width 309 facing the rotor and the pole width 310 of the pole from the base ring is a consequence of available materials. A pole front width (309) of 1 cm and length 1 cm will receive a peak flux of approximatively 1.1 T×0.636= 0.70E-4 Vs. To keep the peak flux density to some 1.5 T in the base pole iron, its width (310) should be in the order of 0.7/1.5=0.46 cm, giving a relation of approximatively 2 to 1.

Figure 3C:
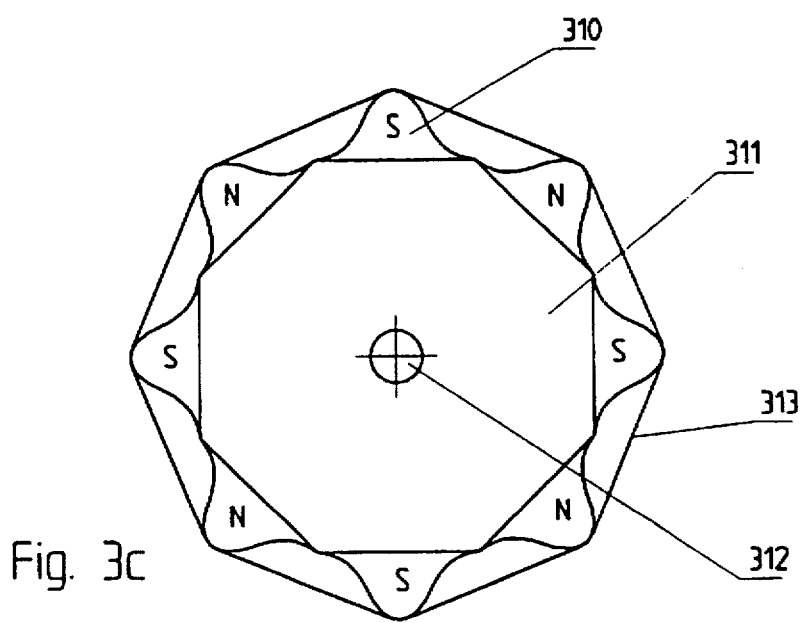
FIG. 3c shows a rotor arrangement giving a sinusoidal back-emf using fully magnetized permanent magnets on the rotor.

FIG. 3c shows a rotor where a approximatively sinusoidal back emf is arranged by the physical shape of the permanent magnets. Unlike the conventional arrangement described for FIG. 3a, the magnets are fully magnetized over their full surface. This arrangement permits the use of fully magnetized magnet material, which reduces magnet material consumption and follows the design goal of the invention to offer a stator design where lower cost high energy magnets always can maintain a high flux intensity on their surface.

In the FIG. 3c, this is arranged by a magnet shape where one single piece 310 has the approximative form of half a sine wave. The magnets like 310 may be glued to an 8 corner disc 311 with an axis 312 and may be additionally secured by the winding of a thin filament element such as high tensile strength wire 313 around the magnets.

The same inventive idea can be embodied in linear slide motors according to the invention and in cylinder shaped or bellshaped rotor motors according to the invention. It can also be applied in conventional brushless motors.

FIG. 4a shows another embodiment of a rotary electric motor according to the invention. Instead of having one coil wound around each pole like the coil 123 around pole 117 as shown in FIGS. 1a–1b, the winding for each phase comprises one single coil around the rotor shaft of the motor.

The magnetically permeably parts of the inner and outer stators can be made of laminated, rolled electrical steel in the same way as in most conventional electric motors as is illustrated in the Figure, but they can alternatively each be formed by two moulded parts comprising a composite material of for example surface coated iron powder embedded in a plastic binding phase as will be discussed below with reference to FIGS. 7a–7d.

The FIG. 4a shows a section through the motor and FIGS. 4b and 4c show one of the punched and bent parts made of rolled electrical steel plate and forming the upper half of the inner stator.

The motor has twelve poles. More poles will increase the torque for a given small coil current, but it will increase the stray flux for higher coil currents and increase the iron losses for a given speed.

The inner stator comprises a lower part 402, a magnetically permeable annular element 401 and an upper part 403 consisting of the same elements as the lower part 402. Each of these parts 402 and 403 comprises a number of magnetically permeable laminated sheets. One such element is shown in FIGS. 4b and 4c. The annular element 401 can comprise a roll of steel sheet like in a toroid transformer, a stack of punched rings or a moulded part comprising small iron particles.

The inner stator winding 451 has the form of a simple coil concentric with the motor axis 407.

FIG. 4b shows one of the elements constituting the upper and lower stator parts 402 and 403. The even numbered poles 412, 414, etc. of this element are produced by first punching a sheet and then bending the poles as shown in FIG. 4c. The poles 412, 414, etc. of the upper stator parts shown in FIG. 4b correspond to the poles 112, 114, etc. of FIG. 1. The gaps between the stator poles facing the rotor in the same stator part are small compared to the pole pitch because of the laterally protruding, triangularly shaped parts 408 which extend from the essentially rod-shaped pole stems. (Most of the void between the teeth lateral parts indicated at 408 in FIG. 4b will be filled with the odd numbered teeth belonging to the other half of the inner stator.) The purpose of the tooth design is described in detail for the embodiment shown in FIGS. 5a–5c.1

If the bent parts have a uniform thickness, a washer 460 made of electrical steel plate can be inserted between each part as shown in FIG. 4d to fill the empty space that would otherwise appear between the parts. To facilitate the understanding of the drawing, only two parts 460 have been drawn. Like in most motors, there are normally tens or hundreds of similar parts 460 in each stator. The net magnetic flux caused by the rotor magnets in the even numbered poles 412, 414, etc. will have the same polarity and will pass through the base ring 410. It will then continue through the annular part 401, the lower inner stator part 402 and continue to the other rotor magnets through the odd numbered poles. In FIGS. 1a–1b all net magnetic flux in the pole 117 must pass through the coils 123 and one of the coils around poles 116 or 118. In the embodiment of FIG. 4a, the net flux through all the six odd numbered poles must pass the annular part 401 and thus through the inner stator coil 451.

The outer stator is built in the same way as the inner stator. Its annular part 404 corresponds to the inner stator part 401 and the outer stator coil 453 corresponds to the inner stator coil 451. When the outer stator is built from stacked sheets, these will have the shape of an outer base ring from which the poles (corresponding to every other pole of the complete outer stator) extend inwards in a generally radial direction. In the embodiment shown in FIG. 4a, the average circumferential length of the outer coil is approximately twice that of the inner coil. To obtain the same resistance for both phases, the cross section area of the outer coil should be approximately twice that of the inner coil, which also can be seen as indicated in FIG. 4a.

FIGS. 4e and 4f show an alternative way of arranging the flux path from the upper stator part 406 to the lower part 405. It comprises small vertical strips 462 of rolled electrical steel plate facing the end of the horizontal part forming the stator parts 406 and 405. The strips can be kept in place by a retaining ring 461. With this arrangement the flux lines in the top sheet part of the stator 406 do not have to pass all the air gaps between all the other sheet parts to in 406 to reach down to the lower stator part 405.

The current changes in the windings 451 and 453 will impose an emf, that could cause a loop current through the shaft, the bearings, the upper bearing fixture 455, the rear cover 454, the outer stator 404–405–406 and the front shield 457. To avoid this an electrical insulation should be inserted somewhere in this possible loop, for example by making the bearing fixture 455 of an electrically insulating material.

The permanent magnets 411 of the rotor are inserted in or attached to the rotor bell 413. The bell 413 could advantageously be made of a light, electrically and magnetically not conducting material. The way of securing of the bell 413 to the rotor shaft 407 is not relevant to the invention.

The magnet part of the rotor can alternatively be made of a mechanically homogenous ring magnetized to give approximately the same flux pattern as individual magnets. Alternatively the magnet part of the rotor can be made of a mechanically homogenous ring magnetized to give a sinusoidal flux distribution along the rotor with a number of sinusoidal periods equal to half the number of poles in a the corresponding separate magnet motor. This will increase the moment of inertia of the rotor but will reduce the cogging torque and give less torque ripple.

FIGS. 5a–5c illustrate yet another embodiment of a rotation motor according to the invention. In this embodiment the rotor is shaped like a disk. Unlike the axial motor shown in FIG. 3a, it has one common coil for each phase. The permanent magnets are inserted in the disk in a way basically similar to the other embodiments as is shown in detail in FIG. 5b, which shows a section along the line b—b in FIG. 5a.

There are two stators, one upper stator, as viewed in the Figure, comprising the moulded magnetically permeable parts 501, 503 and 505, and one lower stator comprising the parts 502, 504 and 506. There is one winding (507 and 508) in each stator. Each winding has the form of simple coil around the rotor shaft 512.

The two stators are located 90 electrical degrees away from each other as shown in FIG. 5b. The pole pieces facing the rotor have the same basic shape as in FIG. 1 in the respect that the gaps between the stator poles facing the rotor in the same stator part are small compared to the pole pitch. This can be seen in FIG. 5b, where the distance between the poles 505 and 503 is small when seen from the magnets in the rotor disc. This increases the minimum flux density in the rotor magnets, which permits a wider selection of permanent magnet materials. It will also reduce the residual torque.

The pole pieces are also arranged to reduce the stray flux in the air between for example the poles 503 and 505. This is achieved by the shape as seen in FIGS. 5b–5c. In FIG. 5b it is shown that the distance between adjacent pole pieces is short adjacent to the rotor path, where the poles face the rotor magnets like 511, but is wider further away from the rotor magnets. In FIG. 5a and an enlarged detail thereof shown in FIG. 5c is shown that the pole pieces 503 are separated from the pole pieces 505 also in the other direction. The main area where the flux leakage in the air will take place is shaded in FIG. 5c, with more intense shading in the lower part where the distance between the pole pieces 503 and 505 is smaller. In the embodiment shown in FIGS. 5a–5c, this flux leakage area is shaped like a gothic arc. In the motor in FIG. 4a it is basically triangular.

The two stators are mechanically attached to each other by means not shown in FIGS. 5a–5c. The three moulded parts like 501, 503 and 505 of the upper rotor, as seen in the Figure, are attached to each other by glue, screws or other means not relevant to the invention and not shown.

The permanent magnets 511 of the rotor are inserted in or attached to the rotor disk, 513. The disk 513 could as above advantageously be made of a light, electrically and magnetically not conducting material. The way of securing the disc 513 to the rotor shaft 512 is not relevant to the invention and is not indicated in the Figure.

Small motors similar to the embodiment shown in FIG. 5a can often with advantage be made with a homogenous permanent ring replacing the individual magnets shown in FIG. 5b as this often gives lower assembly costs, and permits lower cogging torques. A much lower pole number than the one shown will give lower iron losses and thus permit operations at higher speeds. It will also reduce the stray fluxes, thus permitting higher mechanical output power at the expense of higher copper losses at low speed and moderate torques.

The electric motor according to FIGS. 5a–5c has two potential disadvantages. Loop currents caused by current shifts in the windings 507 and 508 can flow through the bearings, the rotor shaft and the elements 501-515-502. There are many possible solutions of this potential problem; one is to make the lower shield 502 of an iron composite material having a negligible electrical conductivity. Another potential problem is the stray field which in some rotor positions will flow from the upper stator element 505 to the lower stator element. 506 and which could cause undesired effects on objects close to the outer sleeve 515 of the motor. This problem can be reduced by increasing the diameter of the outer sleeve 515.

FIGS. 6a–6d illustrate an embodiment of a linear motor according to the invention. In this embodiment the "rotor" is replaced by a "slider" or "slide" which has two parallel rows of permanent magnets. As in the rotary motors described above, the permanent magnets in each row are oriented with opposite polarities.

Figure 6A:
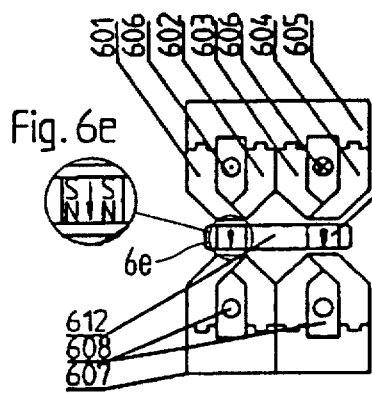
FIG. 6a schematically shows a cross section of a linear motor according to the invention which has moulded stator parts and a single coil winding common to all poles in a phase.
Figure 6C:
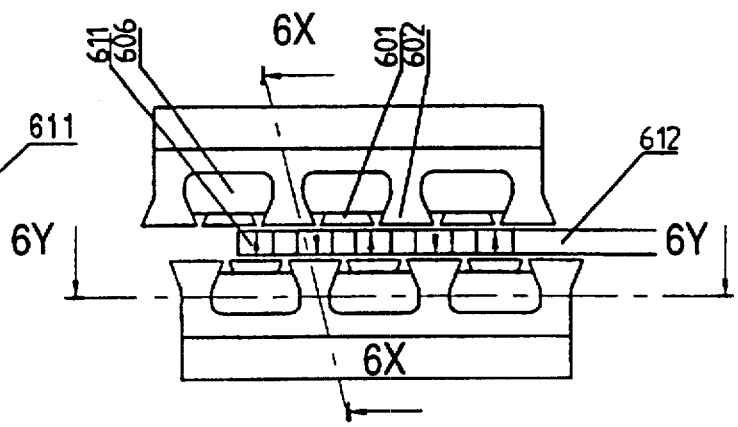
FIG. 6c shows a partial top view of the linear motor of FIG. 6a. The motor of FIGS. 6a-6c is suitably made by the use of stacked iron sheet or metal powder technology.
Figure 6B:
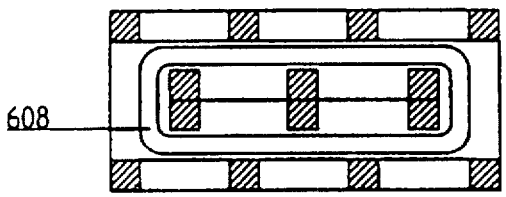

There are two stator parts, one upper stator, as seen in FIGS. 6a and 6c, located on one side of the slide, comprising the moulded magnetically permeable parts 601–605, and one lower stator 607 at the other side of the slide. There is one winding (606 and 608, respectively) in each stator. Each winding has the shape of a simple coil configured as a closed loop having two long, parallel sides.

The two stator are located 90 electrical degrees away from each other as indicated in FIG. 6c. The two stators are mechanically attached to each other by means not shown in FIGS. 6a–6c. The five moulded parts of each stator, elements 601–605 of the upper stator, are attached to each other by glue, screws or other means not relevant to the invention. The pole pieces facing the slider have the same basic shape as in FIGS. 1a–1b in the respect that the gaps between the stator poles facing the slider in the same stator are small compared to the pole pitch. This can be seen in FIG. 6c, where the distance between the poles 601 and 602 is small when seen from the position of the magnets in the slider. The purpose of the tooth design is described in detail for the rotation motor shown in FIGS. 5a–5c.

The slider permanent magnets 611 are inserted in the slider fixture or support 612. The fixture 612 could as above advantageously be made of a light, electrically and magnetically not conducting material.

The magnet part of the slider can alternatively be made of a mechanically homogenous bar magnetized to give approximately the same flux pattern as individual magnets. This will however, as above, increase the mass of the slider.

The linear bearings used to keep the slider fixture 612 in place and the means used to connect the fixture 612 to the load are not relevant to the invention and are not shown.

Figure 6D:
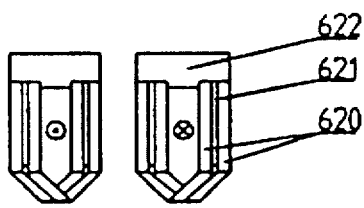
FIG. 6d shows schematically, in a view similar to that of FIG. 6a, a portion of a stator made of stacked electrical steel sheets for a linear motor similar to that in FIGS. 6a-6c.

FIG. 6d shows the upper stator part of an embodiment similar to the one shown in FIG. 6a. In FIG. 6d, however, the stator is built of punched and (for the parts 620 also bent) parts of rolled electrical steel plate. Filler strips 621 may be inserted like the filler washers 460 in FIG. 4d. To facilitate the understanding of the drawing, only two parts 620 have been drawn. Like in most conventional electric motors, there are normally tens of hundreds of similar parts 620 in each stator. The parts 622 are punched rolled electrical steel parts stacked in a similar way as illustrated in FIG. 4e.

The stator design shown in FIG. 6d can in principle also be used for axial rotational motors. This requires equipment that like the equipment mentioned in the description of FIGS. 3a and 3b can punch poles adapted to the coiling of the stator sheet, but requires the added functionality of bending the poles after punching.

FIGS. 7a–7d show another embodiment of a rotation motor according to the invention similar to the embodiment shown in FIGS. 4a–4f. The stator parts are here moulded using small particles of for example iron and an insulating phase, for example some thermoplastic.

FIG. 7a shows an axial section through the motor and FIGS. 7b–7d show three radial sections through the lower moulded part, as seen in the Figure, which forms the inner stator. The sections shown in FIGS. 7b–7d are taken along the lines indicated at "B—B", "C—C" and "D—D" respectively in FIG. 7a.

The motor has 16 poles as illustrated in the Figures. It will often be suitable to have many more poles; this will increase the torque for a given coil current. The higher flux frequency for a given angular speed increases however with a higher number of poles.

The even numbered poles 712, 714, etc. of the inner stator are moulded together with the lower base ring 717. The moulded parts of the upper and lower inner stator have the same shape but are arranged facing each other and having an angular offset corresponding to the pole pitch of the assembled stator.

The principal magnetic flux paths are the same as in the rotation motor shown in FIGS. 4a–4f. The flux enters all even numbered teeth like 701, passes through the lower base ring 717 and goes to upper inner stator part through the surface 718. The teeth like 701 are thinner in the top thereof as shown in FIG. 7b and will have a progressively larger cross section closer to the base ring 717 as shown in FIG. 7c and 7d. The larger cross section is needed as progressively more permanent magnet flux has to be transferred through the tooth down to the base 717. As can be seen from the section line "D" in FIG. 7a, the section shown in FIG. 7d must carry the total flux from the permanent magnet 719 possibly standing in front of the tooth. The inner stator winding is one coil located at 723 and wound around the rotor shaft. The purpose of the tooth design concerning residual torque and flux leakage is described in detail for the embodiment shown in FIGS. 5a–5c.

The permanent magnets 719 of the rotor are inserted in or attached to the bell-shaped rotor structure 720. The structure 720 may as above advantageously be made of a light, electrically and magnetically not conducting material. The way of securing of the structure 720 to the rotor shaft 721 is not relevant to the invention and is not indication in the Figures. The magnet part of the rotor can, as above, alternatively be made of a mechanically homogenous ring magnetized to give approximately the same flux pattern as individual magnets. This will however, as has been stated above, increase the moment of inertia of the rotor.

The outer stator is built in the same way. The surface 722 corresponds to the inner stator surface 718 and the outer stator coil located at 724 corresponds to the inner stator coil 723. The cross section area of the outer stator coil 724 is larger than that of the inner stator coil 723, thus permitting the resistances to be more equal, as has been already described for the motor of FIGS. 4a–4f.

The embodiment according to FIG. 7a has two potential disadvantages. Loop currents caused by current shifts in the windings located at 723 and 724 can flow through the bearings, the rotor shaft, the front and rear shields and the outer stator. There are many possible solutions of this potential problem; one has been shown as an insulated bearing fixture in FIG. 4a. Another potential problem is the stray field that in some rotor positions will flow from the inner to the outer stator and which could cause undesired effects on objects close to the motor front or rear shields. This problem can be reduced by inserting an electrically not conducting, heat conducting element 725. This will however increase the axial length of the motor.

FIGS. 8a–8c show an embodiment of a motor according to invention which has a disc-shaped rotor and stator parts built of totally four identical moulded iron powder parts.

FIG. 8a shows a side view of a wound motor with all magnetically relevant part in their place. The shaft 801 exits from the front stator part 802–803, which is built of two poles 802 and 803. The poles consist each of a moulded iron powder part. This element is shown unwound in FIG. 8c. The two windings 804 and 805 of the front stator part are visible as well as the winding 806 of one of the two poles of the rear stator part.

FIG. 8b shows a section through the motor of FIG. 8a with the winding wires removed. Only the pole 803 of the front stator parts is seen; the section extends through the borderline between the two front stator parts 802 and 803. The section view passes through the two rear stator parts 807 and 808. The moulded iron powder part 808 is shown separate as seen in the same sectional view in FIG. 8c.

The motor has a disc shaped rotor 810 consisting of a ring of high energy magnet material like NeFeB with two poles. Two rotor bearings 811 and 812 with nonmagnetic runways enforces an airgap like 814 between the rotor 810 and the stator parts; the attraction of the rotor magnet will ensure a preloading of the bearings. The distance ring 813 will restrain the front and rear stator parts from disalignment. To reduce the bearing preload, a spring washer can be inserted between the stator parts and the bearings. In such a case, the distance ring 813 will balance the attraction of the rotor magnet on the stator parts. Motor case and auxiliary parts to keep the motor together are not relevant to the invention and are not shown.

Figure 9A:
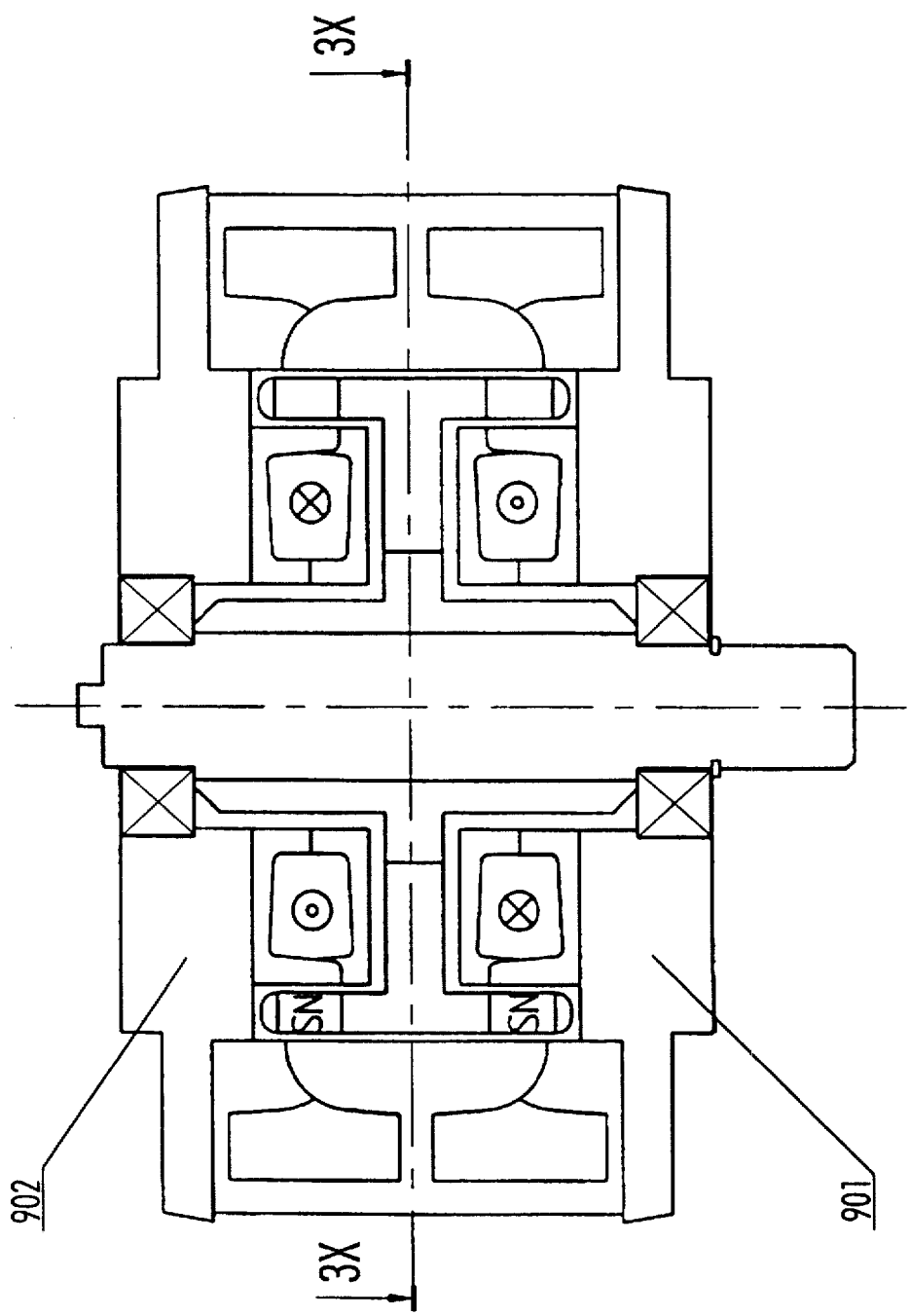
FIG. 9a shows an embodiment of a motor according to invention which has a beltwheel shaped rotor and two stator parts for each phase, each phase having a single coil winding. The embodiment is well suited to be manufactured by means of metal powder technology.

FIG. 9a shows an embodiment of a rotation motor, where the disadvantages of the above mentioned motors of FIGS. 4a–4f, 5a–5c and 7a–7d basically are eliminated. As far as the permanent magnets of the rotor, the flux permeable parts of the stator and the windings are concerned, the motor is symmetric with respect to the plane indicated by the line A—A. There is therefore no magnetic force causing a stray magnetic flux across the plane indicated at line A—A. Objects outside the outer stators will therefore not be affected by varying magnetic fields.

The currents in the two inner stators will flow in different directions and the voltages which they will induce in the motor shaft will therefore cancel each other. The same is true for the currents in the outer stator.

The front shield 901 and rear shield 902 can as above be made of a magnetically and electrically nonconducting, thermally conductive material like a metal powder composite material or a suitable ceramic. The distance from the exterior surfaces of the shields to the inner stators will reduce the effects or stray flux from inner to outer stator.

Figure 9C:
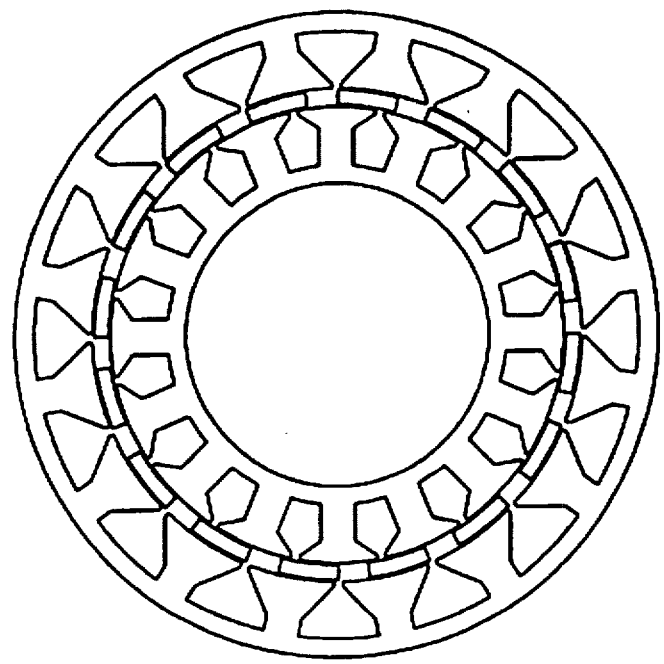
FIGS. 9b-9c show an embodiment of a motor according to invention which has a beltwheel shaped rotor, four stator parts and four phases. The embodiment is well suited to be manufactured by rolled steel.
Figure 9B:
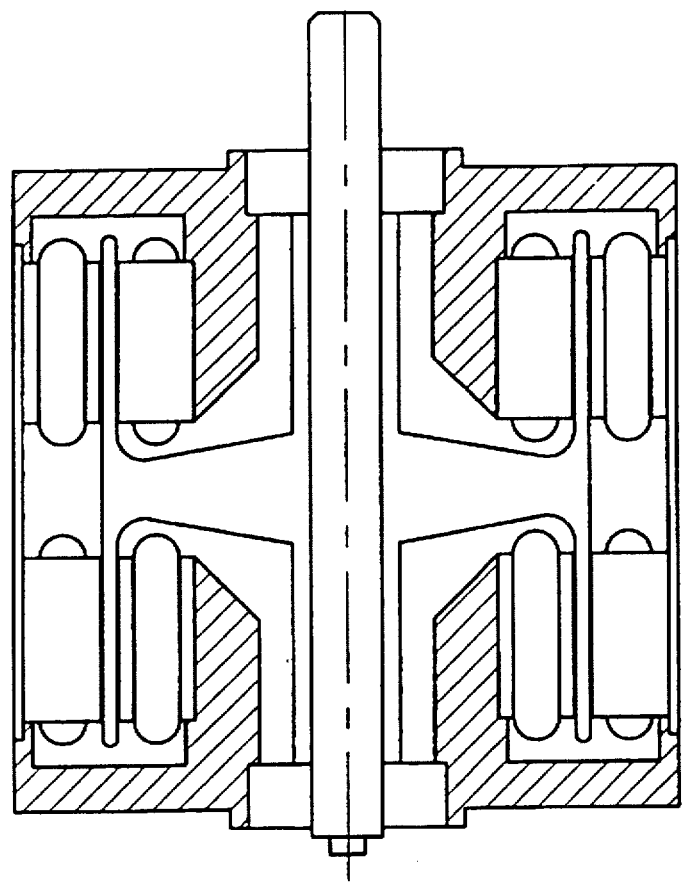

FIGS. 9b and 9c show an axial sectional view and radial view of a four phase rotation motor according to the invention. The motor has individually wound poles. This embodiment is basically two motors as shown in FIGS. 1a–1b built together using the same rotational shaft; thus the radial section of FIG. 9c is similar to that of FIG. 1a. By assembling the two systems 45 electrical degrees apart, the ripple torque can be reduced as compared to a two-phase system.

FIG. 10 shows an embodiment of a linear motor according to the invention having individually wound poles and four phases.

The motor comprises a central slide which is inserted in a slot between two stators. The active parts of the slide comprise 10 magnets 1001–1010. These magnets are attached to each other by a magnetically inactive material, not shown and the kind of which is not relevant to the invention, in order to form a stiff and straight slide. The magnet poles may preferably be made of permanent magnet material like NdFeB, NdPrFeB or SnCo. The permanent magnet poles are oriented so that all even numbered poles have the same polarity and all odd numbered poles have the opposite polarity. The magnets cover as above somewhat more than ½ of the pole pitch length.

The stator comprises, as viewed in the Figure, one upper and one lower stator part pair, each pair having 2 phases. The upper stator pair comprises a left part having six poles with a base or support 1063 and 6 pole teeth 1021–1026 made of for example laminated iron like in most conventional electric motors. Depending on the requirements of the motor, most or all poles like 1021–1026 have windings. If the obtainable force is more important than the winding losses, all poles are wound. If the winding losses are to be kept at a minimum, only those poles which are always engaged with magnets of the slide are wound.

The motor of FIG. 10 has four phases, each one having or belonging to one pole group; all poles on the top left stator, as seen in the Figure, i.e. the 6 poles 1021–1026, form one group and all poles on the upper right stator, i.e. the 6 poles 1041–1046, form another group.

All stator poles in one group have the same pole pitch, which is the same as the pitch of the permanent magnet poles on the slide.

The wound poles may thus have a coil wound around each single pole similar to the winding shown at 123 in FIG. 1b. The coils around the even numbered poles 1022, 1024 and 1026 are wound in the same direction while the coils around the odd numbered poles are wound or connected in the other, opposite direction according to the same principle as has been described for the motor of FIGS. 1a–1b; the upper stator system comprising poles 1021–1026 and 1041–1046 operates in a way similar to the motor of FIGS. 1a–1b.

The lower stator system is also similar to that of the motor of FIGS. 1a–1b, but it has its poles 45 electrical degrees out of phase or offset in relation to the poles of the upper stator system. The arrangement can be described as two two-phase motors mechanically connected to each other having said electrical offset. This will permit a lower ripple of the force (less cogging) when the slide is moving and will reduce the reluctance forces.

The poles 1061 and 1062 in the centre of the left and right stator are flux balancing poles and are normally unwound. The purpose thereof is to provide a high permeability flux path for the permanent magnet pole which is located between the upper and lower stator parts.

The preferable mechanical range of the slide movement is illustrated by the arbitrarily selected point 1071 of the slide having the range from point 1072 to point 1073.

The motor is illustrated having 6 poles in each group. In many cases the number of poles will be much higher. In such cases the number of winding turns for each pole may often be very small.

FIG. 11 shows a winding arrangement for a linear motor according to the invention similar to that shown in FIG. 10 but intended for motors having far more poles in each group. The Figure shows a partial section along the line A—A of the motor in FIG. 10. The winding slot around the pole 1055 is also shown (in the same view as in FIG. 10). The winding comprises four turns of a bandlike conductor 1301–1304 in the shape of two layers both having two conductors like 1303 and 1304 located upon each other. The slot most close to the flux balancing pole 1062 is not used; in motors with maybe 40 poles in each group the flux loss of one pole like 1051 is negligible. Alternatively, other shapes of the flux balancing pole 1062 can reduce this loss even further.

After showing some embodiments of the motors according to the invention, the basic idea of the invention will be described compared to conventional brushless DC motors.

FIGS. 12a–12b show a principal flux pattern in a conventional brushless DC motor and the motors according to the invention respectively.

FIG. 12a thus shows a section through a conventional brushless linear DC motor. There are two permanent magnets 1201 and 1202 attached to a back iron 1203 and six stator poles 1211–1216. The section shown corresponds to 360 electrical degrees. There are winding slots 1221–1227, of which 1222 and 1225 belong to phase R and slots 1223 and 1226 belongs to phase S. The dimensions of the system is given in some arbitrary units. The winding slots like 1222 are 1 unit wide and 14 units high and have an area of 13.75 square units, the pole pieces taking 0.25 square units away. The magnets like 1201 are 6 units wide. The flux from the magnets should pass the stator poles like 1212. If the magnet 1201 is moved 1.5 unit to the right, it will face only stator poles 1212 and 1213. The peak flux density in the stator poles will therefore be 1.5 times higher than in the permanent magnets like 1201 as the flux from 6 length units of magnets must pass 4 length units of pole iron.

If the magnets would be moved to the right, the N-flux in stator pole 1211 would decrease, the S-flux in stator pole 1214 would decrease, the N-flux in stator pole 1213 would increase and the S-flux in stator pole 1216 would increase. Both the R-coil through slots 1222 and 1225 and the S-oil through slots 1223 and 1226 would get more N-flux because of pole 1213 and less S-flux because of pole 1214, and both the R and S phase would get an emf able to create a force on the permanent magnets.

FIG. 12b shows a motor according to the invention. It has a first part (the slide) 1250 consisting of permanent magnet poles 1251 and 1252. Above and below this slide there is one pair of wound stator parts, consisting of an upper stator part 1260 and one lower stator part 1270 having poles of magnetically highly permeable material 1261–1263 and 1271–1272 facing the two sides of the slide 1250 through two small air gaps 1253 and 1254.

The magnetic orientation of the permanent magnet poles 1251 and 1252 of the slide 1250 are basically perpendicular to the two surfaces of the slide that faces the stator parts 1260 and 1270.

For all positions of the slide, most of the permanent magnet poles like 1250 of the slide is in a position where it can drive a magnetic flux loop through the upper airgap 1254, into a facing pole 1262 of magnetically highly permeable material of the upper stator part 1260, through this stator part 1260, back through the same upper airgap 1254, through one adjacent permanent slide magnet pole 1252, through the second airgap 1253, into a pole 1272 of magnetically highly permeable material of the lower stator part 1270, through this lower stator part 1270, back through the same second airgap 1253 to the original slide permanent magnet pole 1251.

In the slide position shown, the position of slide permanent magnet pole 1251 is such that this flux loop will pass the winding of the winding slot 1274 of the lower stator part 1270.

As described above for various embodiments like the one shown in FIG. 1a, the winding in the slots 1264 and 1265 of the upper stator part 1260 belong to only one phase V, and the winding in the slots 1273-1275 of the upper stator part 1260 belong to only one phase U.

As has also been described above for various embodiments like the one shown in FIG. 1a, the emf of the phase (V) of upper stator part 1260 is basically 90 electrical degrees from the emf of the phase (U) of the lower stator part. In FIG. 12b each stator part has at least two stator poles facing the slide, and the pitch of the stator poles like 1262 and 1263 of a stator part are the same as the pitch of the permanent magnet poles 1251 and 1252 of the slide facing that stator part 1260. As the FIG. 12b shows a linear motor, the pitch is the same on both sides of the slide. In FIG. 1a, illustrating a rotation embodiment, the outer radius of the rotor is larger than the inner radius and the pitches are therefore different when expressed as a length, but identical when expressed as an angle.

The length of the gaps like 1276 between two adjacent stator poles like 1271 and 1272 of the lower stator part facing the path of the permanent magnet poles of the slide is small (0.5 units) compared to the length of the stator poles like 1271 and 1272 facing the path of the permanent magnet poles of the slide (8.5 units).

The stator poles are shaped in such a way that the distance like 1277 between the adjacent stator poles like 1271 and 1272 in the same stator part like 1270 close to the stator part surface facing the path of the permanent magnet poles of the slide 1250 increases with the distance 1278 from the stator part surface facing the path of the permanent magnet poles of the slide, so that the distance like 1277 in not magnetically highly permeable material which must be passed by leakage flux is relatively long except very close to the stator part surface facing the path of the permanent magnet poles of the slide.

The dimensions of the system is given in the same arbitrary units as used in FIG. 12a. The winding slots like 1274 are 5 units wide and 7 units high and have an area of 28.75 square units, the pole pieces taking 6.25 square units away. The magnets like 1251 are 6 units wide. The flux from the magnets should pass the stator poles like 1271. In the position shown for the magnet 1251 it faces only stator pole 1271 in the lower stator part 1270. The peak flux density in the stator poles will therefore be 1.5 times higher than in the permanent magnets like 1251, or the same as for the motor of FIG. 12a.

If the magnets would be moved to the right, the S-flux in stator pole 1262 would increase for two reasons. In the initial position shown, all the S-flux into pole 1206 will be taken out of the same pole by the N-flux generated by permanent magnet pole 1252. When the slide moves, more S-flux will enter from magnet 1251, and the same amount of N-flux will be withdrawn due to the movement of magnet 1252. Therefore, the V coil through slot 1265 will get the same increase of N-flux as the R and S coils in FIG. 12a would have got from the same movement of the slide, and the V phase would get a emf able to create a force on the permanent magnets.

A comparison between the two motors show that they have approximatively the same weight and the same volume (both are 20 units high).

The iron losses is given by the volume of iron having high peak to peak transitions. Assuming that the motors have the same length, this volume is linear in the area of iron poles and back iron. For the conventional motor of FIG. 12a this area is 6×(14×2)+18×2=204 square units. For the motor according to the invention of FIG. 12b this area is 2×2×(7× 4)+2×2×18=184 square units (two stator part with two poles each of 7×4 units). The current carrying winding area for the conventional motor of FIG. 12a is 2×13.75=27.5 square units (both phase R and S are active at the same time). For the motor according to the invention as indicated in FIG. 12b this area is 28.75 square units, or almost the same. This is true for very long motors. For short motors the conventional motor phases require long winding paths outside the iron (as the R and S windings block the way out for the T winding etc), often resulting in that less than half the winding length is inside the stator iron. For motors according to the invention, the coils are simply wound around the pole. There is therefore little need for long wires outside of the iron stator.

For very low loads, the flux from the permanent magnets will follow the iron poles. At higher loads, the permanent magnet stray flux will increase. In the motor according to the invention, a stray flux line like 1290 passing the center of the winding must pass a low permeable path 5 units long, while the corresponding line 1240 of a conventional motor only must pass 2 units length of a low permeable path.

The winding stray flux from the half of the winding distant from the permanent magnets must pass 1 unit length of a low permeable path in the conventional motor and has a remaining height of 7 units over which to spread its intensity. The stray flux from the half of the winding distant from the permanent magnets must pass 1-5 units length of a low permeable path in the motor according to the invention and has a remaining height of 3.5 units over which to spread its intensity. As the energy required to build up flux increases linearly with the length and increases with the square of the intensity, the energy required in the conventional motor is proportional to 1/(7×7) and 3/(3.5×3.5), that is 12 times higher, for the motor according to the invention.

Therefore, for motors of the same volume and same pole density, the motors according to the invention will have lower copper losses for motors having a short stator length. They give much lower stray fluxes for a given current density, which means better peak torques and much less deterioration of the torque-current motor constant at higher loads. This means that high torques can be obtained with a lower current and thus gives better efficiency and higher continuous torques.

The comparison above assumes equal pole density (both motors have the same slide pole pitch). The conventional motor as of FIG. 12a can get lower stray flux losses if the pitch is increased. Getting the same winding slot width of 5 units would require 5 times larger pitch, which would increase the height of the backiron and base iron to 10 units each, giving no space left for either poles, magnets or windings.

It must be emphasized that the motors according to the invention should not be confused with stepper motors. The shape of the poles and the small inter pole gaps close to the rotor and slide make them useless as stepper motors. Referring to FIG. 12b, the slide position will move rather freely 1 unit to the left or right from its shown position if phase U gets current and phase V is without current. In a stepper motor, the slide or rotor position is well defined when one phase gets full current.

As is obvious to anyone skilled in the art, the electric motors as described above may undergo changes and modifications within the inventive concepts.

Normal functional details and principles common to brushless motors have not been mentioned in the descriptions of the principles of operation or of different embodiments. Some examples will be listed here. The motors require some power electronics to control the currents in the windings, and angular transducers for permitting this power electronics to energize the correct phase(s) with proper currents. The magnets should in some cases be divided into electrically insulated sections. The stators can in some cases be skewed to reduce cogging torque.

The descriptions above have been made for trapezoidal back-emf motors and for sinusoidal back-emf motors. By changing the shape of individual magnets, by different magnetization etc., other back-emf form motors can be obtained. The two basic types described will however permit those skilled in the art to make adjustments if necessary for other back-emf forms.

I claim:

1. A brushless, electric motor or generator comprising
   a first part comprising permanent magnet poles having equally spaced north and south poles and with no or little soft iron parts,
   at least one pair of second parts, all being rigidly attached to each other, and comprising electrical windings and having poles of a magnetically highly permeable material, the poles of one member of a second part pair facing one side of the first part and the poles of the other member of said second part pair facing another side of the first part, an air gap separating the magnetically highly permeable material poles of the second parts from the corresponding side of the first part,
   the first part being movable in relation to the second parts, wherein
   the magnetic orientation of the permanent magnet poles of the first part is substantially perpendicular to the two sides of the first part which face the second parts,
   the shape and distances of the first and second parts are such that, for all positions of the first part in relation to the second parts, most of the permanent magnet poles of the first part are in a position where each permanent magnet pole can drive a magnetic flux loop through a first one of said airgaps, into a facing pole of a magnetically highly permeable material of a first member of a second part pair, through this first member of a second part pair, back through the same first airgap, through one adjacent permanent magnet pole of the first part, through a second one of said airgaps, into a pole of magnetically highly permeable material of the second member of the same second part pair, through this second member of the same second part pair and back through the same second airgap to the original permanent magnet pole of the first part,
   for all positions of the first part, most of the permanent magnet poles of the first part are in a position where said flux loops of two adjacent permanent magnet poles of the first part will pass windings of at least one or both of the two members of a second part pair,
   the winding or windings of one second part belong to only one electrical phase,
   the emf of the phase of one part in each second part pair is substantially 90 electrical degrees apart from the emf of the phase of the other part in the same second part pair,
   each second part has at least two poles facing the first part,
   the pitch of the poles of each second part is substantially the same as the pitch of the permanent magnet poles of the first part facing that second part,
   the area of the gaps between two adjacent poles of a second part and facing a side of the first part is less than the area of the poles of said second part facing the same side of the first part,
   the poles of the second parts are shaped in such a way that the distance between two adjacent poles in the same second part and close to the surface of said poles facing a side of the first part increases with the distance from the surface of said poles facing a side of the first part, so that the distance in not magnetically highly permeable material that must be passed by leakage flux is relatively long except very close to the surface of the second part facing a side of the first part.

2. A motor or generator according to claim 1, wherein the poles of the first and second parts are located in such a way that those permanent magnet poles of the first part, which are not in a position facing a pole of a second part, will face a pole not belonging to any second part permitting a short, highly permeable flux path to the adjacent second parts.

3. A motor or generator according to claim 1 or 2, wherein the first part is a hollow cylinder rotor.

4. A motor or generator according to claim 1 or 2, wherein the first part is a disc-shaped rotor.

5. A motor or generator according to claim 1 or 2, wherein the first part is a linear slide.

6. A motor or generator according to claim 1, wherein the poles of the second parts have an area perpendicular to the flux from the first part being a substantial fraction of the area of the first part magnet pole facing the second part, this substantial fraction of area of the first part being on the order of 0.5 to 1.0.

7. A motor or generator according to claim 1, wherein the poles of the second parts have a width perpendicular to the direction of movement of the first part in relation to the second parts, which is substantially uniform over the length of these poles and is substantially the same as the width of the permanent magnet poles in the same direction.

8. A motor or generator according to claim 1,
   wherein the poles of a second part comprise a first portion located at a base member of said second part, said first portion of each pole having sides, which are located substantially perpendicular to the direction of movement of the first part in relation to the second parts and also to the surface of the first part adjacent to the pole,
   that the poles of the second parts comprise lateral protrusions at their ends facing the first part, the protrusions being connected to said first portion and extending substantially in a direction in parallel and antiparallel with the direction of movement of the first part in relation to the second parts, in such a way that only a small gap in the movement direction is left between adjacent poles of the second part compared to the extension of said poles of the second part at their surfaces facing the first part and in the movement direction.

9. A motor or generator according to claim 8, wherein the added length of said lateral protrusions of a pole of a second part in the direction in parallel and antiparallel with the movement direction is about the length of the first portion of the pole in the same direction.

10. A brushless, electric motor or generator comprising:

a first part comprising permanent magnet poles having equally spaced north and south poles and with no or little soft iron parts, at least one pair of second parts, all being rigidly attached to each other, and comprising electrical windings and having poles of a magnetically highly permeable material, the poles of one member of a second part pair facing one side of the first part and the poles of the other member of said second part pair facing another side of the first part, an air gap separating the magnetically highly permeable material poles of the second parts from the corresponding side of the first part, the first part being movable in relation to the second parts, wherein the magnetic orientation of the permanent magnet poles of the first part is substantially perpendicular to the two sides of the first part which face the second parts, the shape and distances of the first and second parts are such that, for all positions of the first part in relation to the second parts, most of the permanent magnet poles of the first part are in a position where each permanent magnet pole can drive a magnetic flux loop through a first one of said airgaps, into a facing pole of a magnetically highly permeable material of a first member of a second part pair, through this first member of a second part pair, back through the same first airgap, through one adjacent permanent magnet pole of the first part, through a second one of said airgaps, into a pole of magnetically highly permeable material of the second member of the same second part pair, through this second member of the same second part pair and back through the same second airgap to the original permanent magnet pole of the first part, for all positions of the first part, most of the permanent magnet poles of the first part are in a position where said flux loops of two adjacent permanent magnet poles of the first part will pass windings of at least one or both of the two members of a second part pair, the winding or windings of one second part belong to only one electrical phase, the emf of the phase of one part in each second part pair is substantially 90 electrical degrees apart from the emf of the phase of the other part in the same second part pair, each second part has at least two poles facing the first part, the pitch of the poles of each second part is substantially the same as the pitch of the permanent magnet poles of the first part facing that second part, the area of the gaps between two adjacent poles of a second part and facing a side of the first part is less than the area of the poles of said second part facing the same side of the first part, the poles of the second parts are shaped in such a way that the distance between two adjacent poles in the same second part and close to the surface of said poles facing a side of the first part increases with the distance from the surface of said poles facing a side of the first part, so that the distance in not magnetically highly permeable material that must be passed by leakage flux is relatively long except very close to the surface of the second part facing a side of the first part, wherein in the first part the length therealong in the movement direction between a first permanent magnet pole and another magnet pole of the first part is longer than the added lengths of all magnet poles along the first part from the first to the other permanent magnet pole, in such a way that a part of the area of the first part from the first to the other permanent magnet pole is uncovered with permanent magnet poles, the permanent magnet poles covering 55–70% of the length of said area along the first part and in the movement direction.

11. A brushless, electric motor or generator comprising:

a first part comprising permanent magnet poles having equally spaced north and south poles and with no or little soft iron parts, at least one pair of second parts, all being rigidly attached to each other, and comprising electrical windings and having poles of a magnetically highly permeable material, the poles of one member of a second part pair facing one side of the first part and the poles of the other member of said second part pair facing another side of the first part, an air gap separating the magnetically highly permeable material poles of the second parts from the corresponding side of the first part, the first part being movable in relation to the second parts, wherein the magnetic orientation of the permanent magnet poles of the first part is substantially perpendicular to the two sides of the first part which face the second parts, the shape and distances of the first and second parts are such that, for all positions of the first part in relation to the second parts, most of the permanent magnet poles of the first part are in a position where each permanent magnet pole can drive a magnetic flux loop through a first one of said airgaps, into a facing pole of a magnetically highly permeable material of a first member of a second part pair, through this first member of a second part pair, back through the same first airgap, through one adjacent permanent magnet pole of the first part, through a second one of said airgaps, into a pole of magnetically highly permeable material of the second member of the same second part pair, through this second member of the same second part pair and back through the same second airgap to the original permanent magnet pole of the first part, for all positions of the first part, most of the permanent magnet poles of the first part are in a position where said flux loops of two adjacent permanent magnet poles of the first part will pass windings of at least one or both of the two members of a second part pair, the winding or windings of one second part belong to only one electrical phase, the emf of the phase of one part in each second part pair is substantially 90 electrical degrees apart from the emf of the phase of the other part in the same second part pair, each second part has at least two poles facing the first part, the pitch of the poles of each second part is substantially the same as the pitch of the permanent magnet poles of the first part facing that second part, the area of the gaps between two adjacent poles of a second part and facing a side of the first part is less than the area of the poles of said second part facing the same side of the first part, the poles of the second parts are shaped in such a way that the distance between two adjacent poles in the same second part and close to the surface of said poles facing a side of the first part increases with the distance from the surface of said poles facing a side of the first part, so that the distance in not magnetically highly permeable material that must be passed by leakage flux is relatively long except very close to the surface of the second part facing a side of the first part, wherein the length of a permanent magnet pole in the movement direction is substantially smaller than a length of a portion of each of the poles of the second parts, which face a side of the first part, said length of the permanent magnet poles being about 55–75% of said length of the pole portions of the second parts and facing the first part.

12. A brushless, electric motor or generator comprising a first part comprising a rotor or a slide including permanent magnet poles having equally spaced north and south poles, a stator formed from at least one pair of second parts, all being rigidly attached to each other and comprising electrical windings and having poles of a magnetically highly permeable material, the poles of one member of a second part pair facing one side of the first part and the poles of the other member of said second part pair facing another side of the first part, an air gap separating the magnetically highly permeable material poles of the second parts from the corresponding side of the first part, the first part being movable in relation to the second parts, wherein a magnetic orientation of the permanent magnet poles of the first part is substantially perpendicular to the two sides of the first part which face the second parts, the shape and distances of the first and second parts are such that, for at least some positions of the first part in relation to the second parts, the permanent magnet poles of the first part are in a position where each permanent magnet pole can drive a magnetic flux loop through a first one of said airgaps, into a facing pole of a magnetically highly permeable material of a first member of a second part pair, through this first member of a second part pair, back through the same first airgap, through one adjacent permanent magnet pole of the first part, through a second one of said airgaps, into a pole of magnetically highly permeable material of the second member of the same second part pair, through this second member of the same second part pair and back through the same second airgap to the original permanent magnet pole of the first part, for all positions of the first part, most of the permanent magnet poles of the first part are in a position where said flux loops of two adjacent permanent magnet poles of the first part will pass windings of at least one or both of the two members of a second part pair, the winding or windings of one second part belong to only one electrical phase, the emf of the phase of one part in each second part pair is substantially 90 electrical degrees apart from the emf of the phase of the other part in the same second part pair, each second part has at least two poles facing the first part, the pitch of the poles of each second part is substantially the same as the pitch of the permanent magnet poles of the first part facing that second part, the area of the gaps between two adjacent poles of a second part and facing a side of the first part is less than the area of the poles of said second part facing the same side of the first part, the poles of the second parts are shaped in such a way that the distance between two adjacent poles in the same second part and close to the surface of said poles facing a side of the first part increases with the distance from the surface of said poles facing a side of the first part, so that the distance in not magnetically highly permeable material that must be passed by leakage flux is relatively long except very close to the surface of the second part facing a side of the first part.

13. A motor or generator according to claim 12, wherein the first part is a hollow cylinder rotor.

14. A motor or generator according to claim 12, wherein the first part is a disc-shaped rotor.

15. A motor or generator according to claim 12, wherein the first part is a linear slide.

16. A brushless electric motor or generator comprising a first part selected from the group consisting of hollow cylinder rotor, a disc-shaped rotor and a linear slide, the first part comprising permanent magnet poles having equally spaced north and south poles, a stator formed from at least one pair of second parts comprising electrical windings and having poles of a magnetically highly permeable material, the poles of one member of a second part pair facing one side of the first part and the poles of the other member of said second part pair facing another side of the first part, an air gap separating the magnetically highly permeable material poles of the second parts from the corresponding side of the first part, the first part being movable in relation to the second parts in said air gap, wherein a magnetic orientation of the permanent magnet poles of the first part is substantially perpendicular to the two sides of the first part which face the second parts, the shape and distances of the first and second parts are such that, for at least some positions of the first part in relation to the second parts, the permanent magnet poles of the first part are in a position where each permanent magnet pole can drive a magnetic flux loop through a first one of said airgaps, into a facing pole of a magnetically highly permeable material of a first member of a second part pair, through this first member of a second part pair, back through the same first airgap, through one adjacent permanent magnet pole of the first part, through a second one of said airgaps, into a pole of magnetically highly permeable material of the second member of the same second part pair, through this second member of the same second part pair and back through the same second airgap to the original permanent magnet pole of the first part, the permanent magnet poles of the first part are in a position where said flux loops of two adjacent permanent magnet poles of the first part will pass windings of at least one or both of the two members of a second part pair, the winding or windings of one second part belong to only one electrical phase, the emf of the phase of one part in each second part pair is substantially 90 electrical degrees apart from the emf of the phase of the other part in the same second part pair, each second part has at least two poles facing the first part, the pitch of the poles of each second part is substantially the same as the pitch of the permanent magnet poles of the first part facing that second part, the area of the gaps between two adjacent poles of a second part and facing a side of the first part is less than the area of the poles of said second part facing the same side of the first part, the poles of the second parts are shaped in such a way that the distance between two adjacent poles in the same second part and close to the surface of said poles facing a side of the first part increases with the distance from the surface of said poles facing a side of the first part, so that the distance in not magnetically highly permeable material that must be passed by leakage flux is relatively long except very close to the surface of the second part facing a side of the first part.

* * * * *

UNITED STATES PATENT AND TRADEMARK OFFICE
CERTIFICATE OF CORRECTION

PATENT NO.: 5,751,089
DATED: May 12, 1998
INVENTOR(S): LENNART STRIDSBERG

It is certified that errors appear in the above-identified patent and that said Letters Patent is hereby corrected as shown below:

In Col. 6, line 61, replace "Figure 4d shows" with --Figures 4d and 4g show--;

In Col. 7, line 13, replace "Figure 6a schematically shows" with --Figures 6a and 6e schematically show--;

Col. 7, line 34, replace "B - B, C - C and D - D" with --7x - 7x, 7y - 7y and 7z - 7z--;

Col. 7, line 51, replace "Figure 10 shows" with --Figures 10, 10a and 10b show--;

Col. 7, line 55, replace "Figure 10" with --Figures 10, 10a and 10b--;

In Col. 12, line 27, replace "Figure 4d" with --Figures 4d and 4g--;

In Col. 13, line 26, replace "b-b" with --5x-5x--;

In Col. 14, line 27, replace "6d" with --6e--;

In Col. 14, line 34, replace "6a" with --6a, 6e--;

In Col. 14, line 40, replace "stator" with --stators--;

In Col. 15, line 3, replace "Figure 4d" with --Figures 4d and 4g--;

UNITED STATES PATENT AND TRADEMARK OFFICE
CERTIFICATE OF CORRECTION

PATENT NO.: 5,751,089
DATED: May 12, 1998
INVENTOR(S): LENNART STRIDSBERG

It is certified that error appears in the above-identified patent and that said Letters Patent is hereby corrected as shown below:

In Col. 15, line 24, replace ""B - B", "C - C" and "D - D"" with --7x - 7x, 7y - 7y, and 7z - 7z--;

In Col. 16, line 57, replace "A-A" with --9x-9x--;

In Col. 16, line 58, replace "A-A" with --9x-9x--;

In Col. 17, line 12, replace "Figure 10 shows" with --Figures 10, 10a and 10b show--;

In Col. 17, line 38, replace "Figure 10 has" with --Figures 10, 10a and 10b have--; and In Col. 18, line 11, replace "A-A" with --10x-10x--.

Signed and Sealed this

First Day of December, 1998

Attest:

BRUCE LEHMAN

Attesting Officer

Commissioner of Patents and Trademarks